United States Patent
Keefer et al.

(10) Patent No.: US 6,565,635 B2
(45) Date of Patent: May 20, 2003

(54) LAYERED MANIFOLD PRESSURE SWING ADSORPTION DEVICE AND METHOD

(75) Inventors: Bowie G. Keefer, Vancouver (CA); Matthew Babicki, West Vancouver (CA); Brian Sellars, Coquitlam (CA); Ian Spencer Parker, North Vancouver (CA); David G. Doman, Surrey (CA); Alain Carel, Vancouver (CA); Surajit Roy, Burnaby (CA)

(73) Assignee: QuestAir Technologies, Inc., Burnaby (CA)

( * ) Notice: Subject to any disclaimer, the term of this patent is extended or adjusted under 35 U.S.C. 154(b) by 0 days.

(21) Appl. No.: 09/963,236

(22) Filed: Sep. 25, 2001

(65) Prior Publication Data

US 2002/0066367 A1 Jun. 6, 2002

Related U.S. Application Data

(60) Provisional application No. 60/301,723, filed on Jun. 28, 2001.

(30) Foreign Application Priority Data

Sep. 25, 2000 (CA) .............................................. 2320551

(51) Int. Cl.$^7$ .............................................. B01D 53/06
(52) U.S. Cl. .............................. 96/125; 96/130; 96/135
(58) Field of Search ........................ 96/108, 121, 122, 96/124, 125, 130, 135, 143; 95/113

(56) References Cited

U.S. PATENT DOCUMENTS

| | | | |
|---|---|---|---|
| 2,861,651 A | * | 11/1958 | Miller .......................... 95/113 |
| 3,176,446 A | | 4/1965 | Siggelin |
| 3,817,232 A | | 6/1974 | Nakajima et al. |
| 4,046,525 A | * | 9/1977 | Matsuo et al. ................. 95/147 |
| 4,452,612 A | | 6/1984 | Mattia |
| 4,530,705 A | | 7/1985 | Firey |
| 4,702,973 A | | 10/1987 | Keefer et al. |
| 4,758,253 A | | 7/1988 | Davidson et al. |
| 4,781,735 A | | 11/1988 | Tagawa et al. |
| 4,968,329 A | | 11/1990 | Keefer et al. |
| 4,969,935 A | | 11/1990 | Hay |
| 5,082,473 A | | 1/1992 | Keefer et al. |
| 5,133,784 A | | 7/1992 | Boudet et al. |
| 5,246,676 A | | 9/1993 | Hay |

(List continued on next page.)

FOREIGN PATENT DOCUMENTS

DD 259794 A1 9/1988

*Primary Examiner*—David A. Simmons
*Assistant Examiner*—Frank M. Lawrence
(74) *Attorney, Agent, or Firm*—Klarquist Sparkman LLP

(57) ABSTRACT

Disclosed embodiments of the apparatus address the challenges of rotary PSA systems, both axial and radial flow, with M>1 by providing interpenetrating, layered manifolds to accommodate all of the steps of a complex PSA cycle, suitable with equal compactness for any value of "M". This approach extends readily to accommodate a plurality of rotary PSA modules and their cooperating compression machinery within a single layered manifold assembly for a single PSA plant train. Described embodiments of the rotary PSA apparatus include stators that define fluid ports. In particular embodiments of the described apparatus, a second stator defines pressure swing adsorption cycle sectors, each sector being defined by a light product delivery port, light product withdrawal ports, and light reflux return ports. The adsorber elements may directly contact one or more of the stators in a fluidly sealing manner (i.e., have a clearance gap of from about 0 to about 50 microns) using described reinforced adsorbers. The method comprises providing an embodiment of the described apparatus and then supplying at least one feed fluid to pressurize an adsorber element of the adsorber sets to substantially a higher pressure to initiate a pressure swing adsorption cycle.

57 Claims, 36 Drawing Sheets

U.S. PATENT DOCUMENTS

| | | |
|---|---|---|
| 5,328,503 A | 7/1994 | Kumar et al. |
| 5,441,559 A | 8/1995 | Petit et al. |
| RE35,099 E | 11/1995 | Hill |
| 5,487,775 A | 1/1996 | La Cava et al. |
| 5,529,610 A * | 6/1996 | Watson et al. ............... 95/100 |
| 5,827,358 A * | 10/1998 | Kulish et al. ............... 96/115 |
| 6,051,050 A | 4/2000 | Keefer et al. |
| 6,056,804 A | 5/2000 | Keefer et al. |
| 6,063,161 A | 5/2000 | Keefer et al. |
| 6,451,095 B1 * | 9/2002 | Keefer et al. ............... 96/125 |

\* cited by examiner

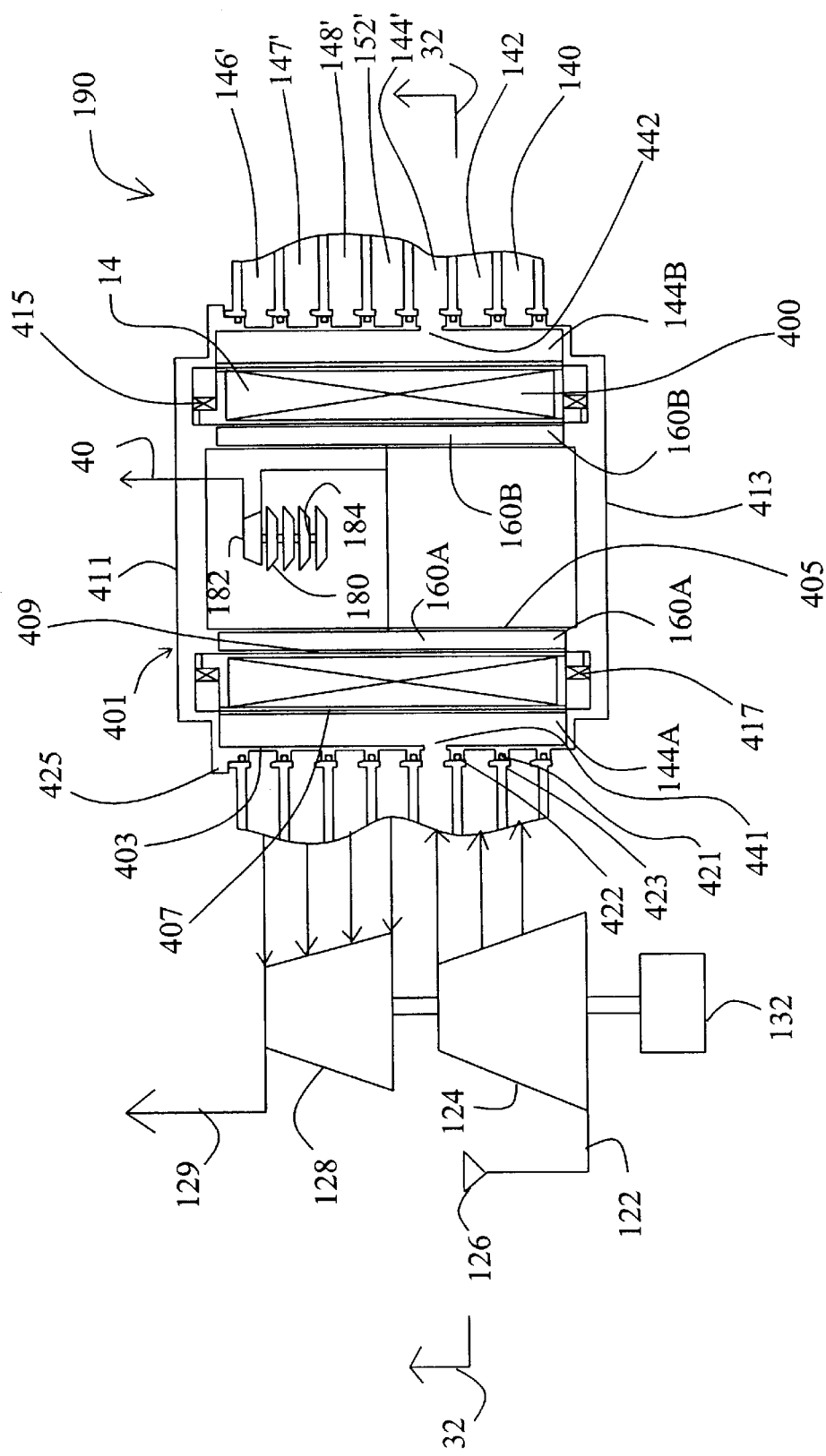

LAYERED MANIFOLD PRESSURE SWING ADSORPTION DEVICE AND METHOD

CROSS REFERENCE TO RELATED APPLICATIONS

This application claims the benefit of applicants' prior U.S. provisional application No. 60/301,723, filed on Jun. 28, 2001, and applicants' prior Canadian application No. 2,320,551, filed on Sep. 25, 2000, the disclosures of which are incorporated herein by reference.

FIELD

Disclosed embodiments of the invention concern fluid separations from a mixture of fluids, such as oxygen separation from air or hydrogen purification, conducted by pressure swing adsorption (PSA) using a fluid separation apparatus having layered manifolds, such as a compact, rotary pressure swing adsorption apparatus operating at high apparatus cycle frequencies. Narrow channel adsorbers, reinforced so as to engage directly with valve faces, also are described that desirably may be used with various embodiments of pressure swing adsorption apparatuses.

BACKGROUND

I. General PSA Process

Fluid separation from a fluid mixture by pressure swing adsorption is achieved by coordinated pressure cycling and flow reversals over an adsorber that preferentially adsorbs a more readily adsorbed component relative to a less readily adsorbed component of the mixture. The total pressure is elevated during intervals of flow in a first direction through the adsorber from a first end to a second end of the adsorber, and is reduced during intervals of flow in the reverse direction. As the cycle is repeated, the less readily adsorbed component is concentrated in the first direction, while the more readily adsorbed component is concentrated in the reverse direction.

A "light" product, depleted in the more readily adsorbed component and enriched in the less readily adsorbed component, is then delivered from the second end of the adsorber. A "heavy" product enriched in the more strongly adsorbed component is exhausted from the first end of the adsorber. The light product usually is the desired product to be purified, as in the important examples of oxygen separation over nitrogen-selective zeolite adsorbents and hydrogen purification. The heavy product may be a desired product in the example of nitrogen separation over nitrogen-selective zeolite adsorbents. Typically, a fluid feed mixture is admitted to the first end of an adsorber and the light product is delivered from the second end of the adsorber when the pressure in that adsorber is elevated to a higher working pressure. The heavy product is exhausted from the first end of the adsorber at a lower working pressure. In order to obtain a highly pure light product, a fraction of the light product or fluid enriched in the less readily adsorbed component is recycled back to the adsorbers as "light reflux" fluid after pressure letdown, e.g. to perform purge, pressure equalization or repressurization steps.

The conventional process for fluid separation by pressure swing adsorption uses two or more adsorbers in parallel, with directional valving at each end of each adsorber to connect the adsorbers in alternating sequence to pressure sources and sinks, thus establishing the changes of working pressure and flow direction. The basic pressure swing adsorption process inefficiently uses applied energy, because of the irreversible expansion over the valves while switching the adsorbers between higher and lower pressures. More sophisticated conventional pressure swing adsorption devices achieve some improvement in efficiency by using multiple "light reflux" steps and other process refinements, but the valve logic complexity based on conventional 2-way valves is greatly increased. As a result, apparatus cycle frequencies are low, with 1 cycle/minute being common, and few commercial devices have cycle frequencies higher than 5 cycles/minute. Furthermore, the cycle frequency with conventional valves and granular adsorbent cannot be greatly increased, so the adsorbent inventory is large. Conventional PSA plants are accordingly bulky and heavy, and there is a need for much more compact PSA technology.

II. Rotary PSA Technology

Siggelin (U.S. Pat. No. 3,176,446), Mattia (U.S. Pat. No. 4,452,612), Davidson and Lywood (U.S. Pat. No. 4,758,253), Boudet et al. (U.S. Pat. No. 5,133,784), Petit et al. (U.S. Pat. No. 5,441,559), Keefer et al. (U.S. Pat. No. 6,051,050) and Westmeier et al. (former German Democratic Republic patent DD 259,794 A1) disclose PSA devices using rotary adsorbent bed configurations. Ports for multiple, angularly separated adsorbent beds mounted on a rotor assembly, sweep past fixed functional ports for the functions of feed admission, product delivery, exhaust discharge and pressure equalization. All of these devices use multiple adsorbent beds operating sequentially on the same cycle, with multiport distributor rotary valves for controlling fluid flows to, from and between the adsorbent beds.

The prior art includes numerous examples of pressure swing adsorption and vacuum swing adsorption devices with three adsorbers operating in parallel. Thus, Hay (U.S. Pat. No. 4,969,935) and Kumar et al. (U.S. Pat. No. 5,328,503) disclose vacuum adsorption systems that do not achieve continuous operation of compressors and vacuum pumps connected at all times to one of the three adsorbers. Such operation is achieved in other three adsorber examples provided by Tagawa et al. (U.S. Pat. No. 4,781,735), Hay (U.S. Pat. No. 5,246,676), and Watson et al. (U.S. Pat. No. 5,411,528), but in each of these latter examples there is some undesirable inversion of the ordering of light product withdrawal and light reflux steps so that process efficiency is compromised. Examples of rotary valve controlled PSA for hydrogen purification with six adsorbers in parallel are provided by Keefer (U.S. Pat. No. 6,063,161).

Some rotary PSA embodiments disclosed by Westrneier et al. (former German Democratic Republic patent DD 259, 794 A1) and by Keefer et al. (U.S. Pat. No. 6,051,050) have a rotational period that is an integer multiple "M" of the cycle period (with M>1). The fixed functional ports for each function must then be provided in the same multiple "M" numerically equal to the integer quotient of the rotational period divided by the cycle period, and positioned at equal angular spacing about the rotational axis. This approach balances pressure loads on the valve faces, reduces rotor-bearing loads, and reduces the friction of sliding seal surfaces in the valve faces. Frictional torque and power required to drive the rotor are reduced by at least the factor "1/M", since angular velocity is reduced by the same factor and contact pressure loads of balanced seals may be reduced as well. With reduced friction, seal life is extended. Consequently higher pressure applications (e.g. hydrogen purification) become more practicable for such rotary PSA devices, as seal life typically will be controlled by the product of sliding velocity (here reduced by the factor "1/M" reflecting the reduction or rotational frequency by the same factor) and contact pressure. However, this approach encounters the following problems:

For a given PSA cycle, the number of adsorbers must be increased by the factor "M". Hence the angular width of each adsorber must be reduced by the same factor "M", resulting in added cost and complexity if the adsorbers are separate fabricated assemblies. Pressure containment, static sealing between adsorbers, and porting of the adsorbers to the valve faces in a rotary PSA system is difficult with a very large number of separate adsorbers. Again, this consideration is more critical when the basic PSA process has a large number of steps and envisages that multiple adsorbers will simultaneously undergo each step, as in U.S. Pat. No. 6,051,050.

As the angular sector allocated to each PSA cycle is 360°/M, angular pressure gradients between the PSA cycle steps are steepened by the factor "M" when M>1. This makes valve face sealing more difficult, so that the potential for cross-leakage between adjacent PSA steps increases. The efficiency improvement of reduced sliding friction with M>1 may thus be offset by efficiency loss due to leakage, so that an important challenge will be to reduce leakage.

Complicated and costly external piping connections in "M" sets must be provided to the opposing sides of the apparatus for each process function with valve ports, while maintaining uniform flow distribution between the plurality of fixed ports Off serving each function. This is much more difficult for PSA cycles with a large number of separate steps for feed pressurization, countercurrent blowdown, and light reflux as disclosed in U.S. Pat. No. 6,051,050.

Manifolding of external piping connections would be even more complex and costly with M>1 when multiple rotary PSA modules are operated in parallel as disclosed in U.S. Pat. No. 6,051,050. Very serious difficulties arise immediately in the complexity and cost of such piping connections, and the problem of balancing pressures drops as required to divide the flows for each process step (or function) equally between all of the modules operating in parallel. These difficulties would render it impracticable to manifold more than a few modules in parallel to be operated with a single compression machinery train, and thus would severely inhibit scaling up to very large PSA process trains with attractive economies of scale.

III Conventional Adsorbents and Adsorbent Supports

The conventional method of supporting adsorbent also is problematic. There is a need for rigid, high-surface-area adsorbent supports that can overcome the limitations of granular adsorbent and enable much higher cycle frequencies. High-surface-area, laminated adsorbers, with the adsorbent supported in thin sheets separated by spacers to define flow channels between adjacent sheets, formed typically as stacked assemblies or as spiral rolls, have been disclosed by Keefer (U.S. Pat. No. 4,968,329 and U.S. Pat. No. 5,082,473, which are incorporated herein by reference). By operating with high-surface-area, laminated adsorbers, with the adsorbent supported in thin sheets separated by spacers to define flow channels between adjacent sheets, and with the adsorbers mounted in a rotor to provide the PSA process valve logic with only one moving part, a high frequency PSA cycle can be performed in an extremely compact apparatus as disclosed by Keefer et al. U.S. Pat. No. 6,051,050, which is incorporated herein by reference.

Rotary adsorber wheels used in thermal swing adsorption (TSA) processes are typically built by spirally winding adsorbent sheet material (e.g. adsorbent impregnated paper) about the rotor hub in corrugated layers. Adjacent layers in the spiral roll are separated by the corrugations. The corrugations define a large number of distinct flow channels between the two faces of the wheel, which contact feed and regeneration zones in distinct angular sectors separated by a sealing partition. The flow channels are typically several millimeters in cross-sectional height and width. Each flow channel acts as a distinct adsorber, being separated from the neighboring flow channels by the corrugations extending between adjacent adsorbent sheets in the spirally rolled rotor. This approach has been successful for TSA processes operating at low frequencies and with minimal pressure differences between the feed and regeneration zones.

Rotary adsorber wheels to be used in high performance PSA processes are subjected to large pressure gradients between the high-pressure adsorption and low-pressure regeneration zones. To achieve desirable high frequency operation for bulk separation applications, such as oxygen enrichment from air, the flow channels must be extremely narrow, e.g. less than 0.5 millimeters and preferably about 0.2 millimeters cross-sectional height for cycle periods of about one second. The channels must be manufactured with high precision to minimize channeling, and fluid leaks between adjacent adsorbers must be minimized.

To avoid mechanical abrasion and flow erosion of fine parallel passage adsorber structures, individual adsorbers have been assembled as "adsorbent laminates" from thin adsorbent sheets and spacers, as set forth by Keefer U.S. Pat. No. 4,702,973, 6,051,050, and Keefer et al in co-pending application "Rotary Pressure Swing Adsorption Apparatus," application Ser. No. 09/591,275, the disclosures of which are incorporated herein by reference. Embodiments also are disclosed in applicants' co-pending application in which a multiplicity of adsorbers is formed within a single spirally rolled adsorbent laminate body, with ribbed spacers extending axially between adjacent sheets so as to define narrow flow channels, which serve as distinct adsorbers that are ported at opposite ends to the rotary valve faces. The assignee's copending application, entitled "Life Support Oxygen Concentrator," application Ser. No. 09/733,606, also is incorporated herein by reference.

Despite the technology discussed above, there still is a need for compact PSA apparatuses, such as compact, rotary PSA apparatus operable at high apparatus and PSA cycle frequencies. Improved adsorbers for use with such devices also are needed.

SUMMARY

Embodiments of an apparatus and method useful for PSA separation of a fluid from a fluid mixture containing a more readily adsorbed component and a less readily adsorbed component are described. The more readily adsorbed component is preferentially adsorbed from a feed fluid mixture by an adsorbent material under increase of pressure, so as to separate from the fluid mixture a heavy product fluid enriched in the more readily adsorbed component, and a light product fluid enriched in the less readily adsorbed component and depleted in the more readily adsorbed component. The PSA apparatus may be combined with other devices to form systems. For example, systems can be formed that include, for example, compression machinery and/or vacuum machinery cooperating with a number "N" of individual adsorbers or "adsorbers" mounted in a rotary PSA module using rotary distributor valves. As another example, the PSA apparatus may be coupled to other devices, such as fuel cells for the automotive industry, or to oxygen delivery and monitoring equipment to medical oxygen generation.

Important aspects of the invention may be categorized according to whether the PSA process is implemented substantially discretely or substantially continuously The distinction is made in considering the steps of the PSA cycle in which the adsorbers are undergoing pressurization or depressurization steps. Here, the pressurization and depressurization steps include feed pressurization steps, product pressurization steps, countercurrent blowdown steps, cocurrent blowdown, and equalization steps.

In one category of embodiments, the PSA process is realized discretely by using a finite number "n" of adsorbers to implement the PSA cycle, such that one and only one adsorber at any typical instant will be undergoing each pressurization or depressurization step of the PSA cycle. Hence, one adsorber at a time is communicating to a stator function port for any pressurization or depressurization step, and the pressure in that function port is changing along with the working pressure in that adsorber over the duration of that step. At the end of the step, that adsorber will be removed from fluid communication with that function port, while another adsorber will be connected to the function port to undergo the same step (either immediately or after a delay interval). The number "n" of adsorbers corresponds approximately to the number of steps of the PSA cycle, noting that the PSA cycle could be arranged for one or a plurality of adsorbers to simultaneously undergo the high pressure production step and likewise one or a plurality of adsorbers to simultaneously undergo the low pressure purge step of the cycle.

In another category of embodiments (introduced in U.S. Pat. No. 6,051,050), the PSA process is realized substantially continuously by using a much larger number "n" of adsorbers to implement the PSA cycle, such that a plurality of adsorbers at any typical instant may in phased sequence be undergoing a pressurization or depressurization step of the PSA cycle. The working pressure in the function port of the pressurization or depressurization step will be approximately constant, even as the working pressure in each adsorber changes while undergoing that step. A throttling restriction (that may be provided by a narrow clearance between the matching faces of the rotor and the stator adjacent that function port in the stator) is needed so that the pressure change of the pressurization or depressurization step for each adsorber is achieved relatively smoothly, while pulsations of the working pressure in the function port of that step are moderated. If a larger number of adsorbers "n" (evenly spaced about the circumference of the rotor) can be provided, pressure pulsations in the function ports will be further reduced and the PSA process will more closely approximate a continuous process. As "n" approaches infinity, the process becomes truly continuous.

In the present invention, a PSA cycle defined for "n" adsorbers is performed on a larger number "N" of adsorbers cooperating in the same PSA cycle and in a rotary PSA module. Defining "M" to be an integer, the number "N" of adsorbers in a rotary PSA module of the disclosed embodiments is the product (N=n×M) where "M" is a number of "adsorber sets" which co-operate in a PSA cycle that is defined for "n" adsorbers, and "n" is the number of adsorbers in each adsorber set. In a rotary module according to the invention, the adsorbers belonging to each adsorber set are spaced angularly apart by an angle 360°/M.

Plural individual laminate adsorbers (either spiral wound rolls or layered blocks) may be used, or a single spiral roll laminate adsorber assembly may be divided into angular segments functioning with separately phased working pressures as independent adsorbers. The present invention further provides examples of spiral rolled adsorbers divided by longitudinal channel spacers into a very large number of channels which each function as a distinct adsorber, so as to achieve a nearly continuous PSA process.

Plural rotary adsorber modules may be used with a common layered manifold structure, applicable with any number of modules to very large PSA plants with the largest capacity rating of single PSA plant trains limited only by the largest capacity ratings of applicable compression turbomachinery.

Disclosed embodiments of the present invention enable high frequency operation, e.g., generally greater than 25 cycles/minute, and preferably hundreds of cycles/minute, of pressure swing and vacuum swing adsorption processes, with high energy efficiency and with compact machinery of low capital cost. The invention applies in particular to separation of air into its various fluid constituents.

I. Described Embodiments of Adsorber Elements

One of the described improvements concerns densifying and strengthening the ends of the adsorber elements, so that the adsorbent laminate structure can engage directly rotary valve faces without excessive abrasion or erosion of the fragile adsorbent, while enduring the large amplitude, cyclic pressure gradients of a high frequency PSA cycle. While preserving highly precise uniformnity of the flow channels porting into the valve faces so as to prevent channeling, the ends of the adsorbers are filled around the flow channels so as to provide sufficient material to resist cross-port leakage between the channels in the valve face clearance. By allowing a very large number of channels functioning as distinct adsorbers with tolerable leakage, these improvements facilitate the use of PSA configurations with M>1. These improvements also enable the practicable use of spirally rolled adsorbers, without complex and bulky structure external to the adsorbers for pressure containment and partitioning of the individual adsorbers.

In preferred embodiments of the invention, the adsorbent is supported in the form of layered adsorbent or "adsorbent laminate," formed from flexible adsorbent sheets. The adsorbent sheets are thin sheets of adsorbent with a composite reinforcement, or as thin foils with the adsorbent. Flow channels are established by spacers forming parallel channels between adjacent pairs of sheets. The channel width between adjacent adsorbent sheets of the experimental adsorbers has been in the range of 50% to 100% of the adsorbent sheet thickness. This "adsorbent laminate" configuration has much lower pressure drop than packed beds, and avoids the fluidization problem of packed beds. The adsorbent sheets are typically in the range of 100 to 175 microns thick.

The sheet-laminate provides desirable compliance to accommodate stacking or rolling errors. Spacer systems provide the necessary stability against unrestrained deflections or distortions that would degrade the uniformity of the flow channels between adjacent layers of adsorbent sheet.

II. Described Embodiments of a PSA Apparatus

Disclosed embodiments of the apparatus further address the challenges of rotary PSA systems (both axial and radial flow) with M>1 by providing layered manifolds (with interpenetrating ducts to connect individual manifold layers to corresponding function ports of the PSA module) to accommodate all of the steps of a complex PSA cycle, suitable with equal compactness for any value of "M". This approach extends readily to accommodate a plurality of rotary PSA modules and their cooperating compression machinery within a single layered manifold assembly for a single PSA plant train. Scale-up of modular PSA equipment to very large single train capacities thus becomes practicable, even with relatively small module ratings.

Embodiments of the described rotary pressure swing adsorption apparatus having layered, interpenetrating manifolds typically include stators that define plural fluid ports, and a rotor, which provides rotational movement relative to the stator(s), to rotate plural adsorber elements into and out of fluid communication with the fluid ports. Described embodiments also generally include a first manifold for receiving a feed fluid. The first manifold is intermittently fluidly coupled via the fluid ports to first ends of the adsorber elements, which may be annularly arranged in adsorber sets about the axis of rotation. A second manifold also may be intermittently fluidly coupled to first ends of the absorber elements in the adsorber sets. The second manifold typically receives an exhaust fluid from the first end of the adsorber elements through plural exhaust ports defined by the stator.

In certain embodiments, first and second annular manifolds are layered one on top of the other. The second manifold may receive or deliver fluid through a fluid conduit penetrating through (or around the perimeter of) the first manifold, the combination of layered manifolds being referred to herein as interpenetrating manifolds. More than two manifolds may be stacked in this layered arrangement, with at least two, and typically all, of the manifolds in the stack being interpenetrating manifolds.

The adsorber elements typically are arranged in adsorber sets of various numbers, such as from 2 to about 20 adsorber sets. Each adsorber set may include plural adsorbent elements. For a rotary bed apparatus, the adsorber elements may be annularly arranged about an axis of rotation such that for "N" adsorbers the angular spacing of the adsorbers is 360/N. Adsorber elements of the adsorber sets sequentially receive feed fluid from the first manifold. In particular embodiments, the rotary pressure swing adsorption apparatus is used for air separation, such that the feed fluid is air, the adsorber elements include a nitrogen-selective zeolite, and the exhaust fluid is nitrogen.

Described embodiments of the rotary pressure swing adsorption apparatus include stators which define fluid ports defined by the stator circumferentially spaced about an axis and over a majority of the planar surfaces. Specific embodiments have the fluid ports spaced over 360 degrees of the stator. For such embodiments, if there are "M" fluid delivery or exhaust ports for a specific step of the PSA cycle, such ports may be arranged at an angular spacing of 360/M.

In particular embodiments of the described apparatus, a second stator defines pressure swing adsorption cycle sectors, each sector being defined by a light product delivery port, light product withdrawal ports, and light reflux return ports. For example, there may be three adsorber elements in a sector, with each adsorber element in the sector belonging to a different adsorber set. Corresponding adsorbers in different sectors each simultaneously may be engaged in a particular portion of the PSA cycle, such as initial pressurization and light product delivery. In such embodiments, light reflux withdrawal ports may be intermittently fluidly coupled to angularly lagging fluid return ports. In more particular embodiments, each sector comprises a light product delivery port, a first light reflux withdrawal port, a second light reflux withdrawal port, a third light reflux withdrawal port, a third light reflux return port, a second light reflux return port, and a first light reflux return port. Fluid conduits are provided that may be sealingly coupled to the ports as desired to accomplished predetermined functions. For example, the first light reflux withdrawal port may be fluidly coupled to the first light reflux return port, the second light reflux withdrawal port may be fluidly coupled to a buffer chamber, the buffer chamber subsequently being fluidly coupled to the second light return port, and the third light reflux withdrawal port may be fluidly coupled to the third light reflux return port. Moreover, the fluid ports may be arranged such that the second ends of the adsorber sets are sequentially fluidly coupled to the first product delivery port, the first light reflux withdrawal port, the second light reflux withdrawal port, the third light reflux withdrawal port, the third light reflux return port, the second light reflux return port, and the first light reflux return port.

When dealing with a fluid, particularly a gas under pressure, care must be taken to minimize fluid leaks. Accordingly, the rotary pressure swing adsorption apparatus may further include seals located adjacent the adsorber element in the valve face between the rotor and the stator, and positioned effectively to minimize fluid leaks. Alternatively, the adsorber elements may directly engage a stator valve face with a narrow clearance gap so as to achieve a sufficient level of fluid sealing between adjacent adsorbers in the rotor and the function ports in the stator, using the reinforced adsorber elements discussed herein.

III. Described Embodiments of a PSA Method

The method comprises providing an embodiment of the described apparatus and then supplying at least one feed fluid to pressurize an adsorber element of the adsorber sets to substantially a higher pressure to initiate a pressure swing adsorption cycle. Relative rotation is established between, e.g., adsorber sets or one or more adsorbent laminate spiral rolls, and first and second valves so as to define the steps of a PSA cycle performed sequentially in each of the adsorber flow channels, while controlling the timings of flow at specified total pressure levels between adsorber flow channels and compression machinery. This relative rotation is achieved at exactly the cycle frequency or at the cycle frequency divided by an integer "M". In certain disclosed embodiments, the adsorbent laminate roll is mounted concentrically in a rotor, which rotates relative to a stator including the first and second valves.

A first light product fluid is delivered at substantially the higher pressure. A light reflux fluid may be withdrawn in portions and each portion used for a predetermined function. For example, portions of the light reflux fluid may be transferred to a buffer chamber. Portions also may be transferred to adjacent fluid inlet ports of second ends of adsorber elements in different adsorber sectors to accomplish various desired tasks, such as desorption of a heavy component from the adsorbent. The method also may include exhausting at least a second product gas at substantially a lower pressure. The apparatus and method allow the assembly of a compact pressure swing apparatus that can perform process steps at a plurality of apparatus locations simultaneously, and further allows multiple pressure swing adsorption processes to be performed per revolution of the rotor.

For particular embodiments of the method, light reflux fluid is withdrawn as first, second, and third light reflux portions. The first light reflux portion is transferred to a second end of an adsorber element of a lagging adsorber set, the second light reflux fluid portion is transferred to a pressure equalisation portion (e.g., a buffer chamber) of the apparatus, and the third light reflux fluid portion is transferred to a second end of an adsorber element in a leading adsorber set. The light reflux portions can be divided in this manner for various reasons, including returning light reflux fluid to purge and partially repressurize the adsorber element.

BRIEF DESCRIPTION OF THE DRAWINGS

FIG. 36 is a cross sectional side view of the module illustrated by FIG. 33.

DETAILED DESCRIPTION

I. Introduction

Figure 1:
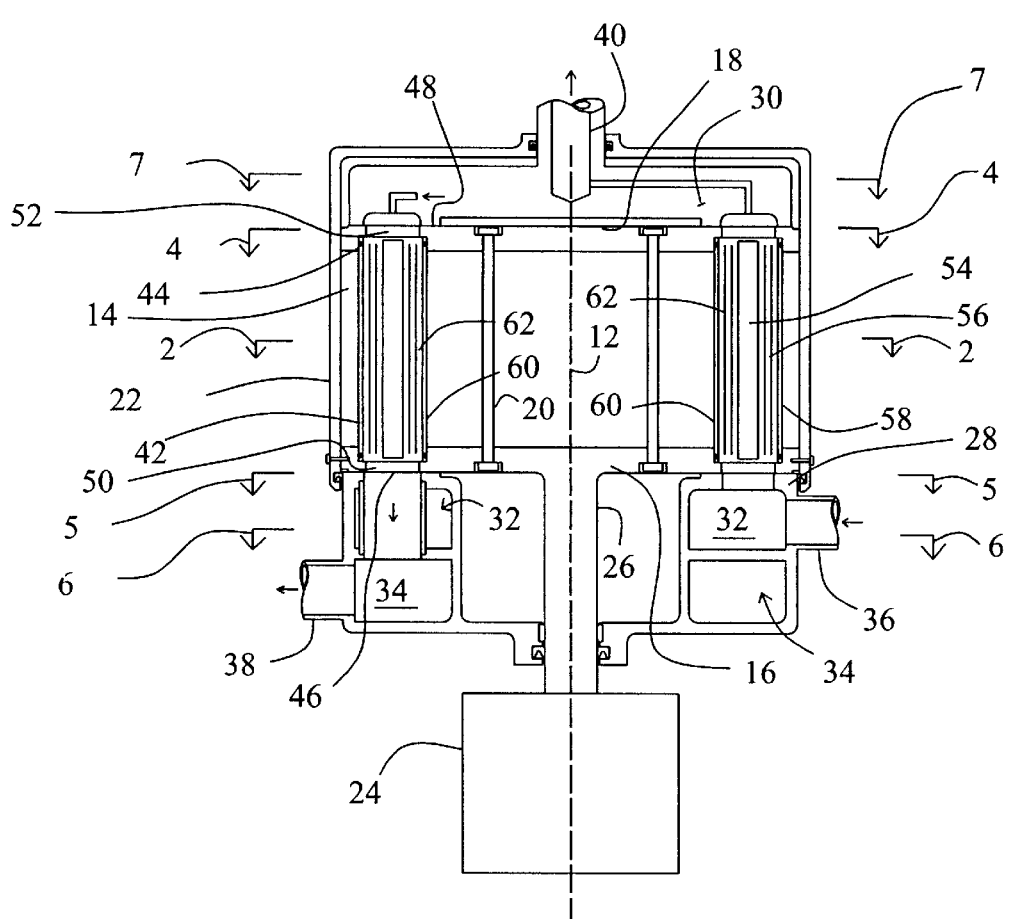
FIG. 1 is an axial section view illustrating one embodiment of a rotary PSA apparatus housing plural compact adsorber elements organized in adsorber sets and having annular layered, interpenetrating manifolds.

In a first embodiment, M=1 so that the compartments for a single cycle extend around the full circumference of 360°, and the rotor revolves at exactly the cycle frequency. However, the invention may also be applied with M greater than 1, in which case the cycle frequency is M times the rotational frequency, and the full set of compartments for each cycle is repeated for each arc of 360°/M so that for each process step there are M compartments at equal angular spacings separated by 360°/M. The flow channels of the adsorbent laminate roll preferably have close angular spacings, so that there is a very large number of flow channels functioning as distinct adsorbers to ensure that the external flows to each step of the PSA process are substantially uniform in flow rate and pressure.

Described embodiments greatly improve the practicability of high-cycle-frequency, rotary PSA systems with M>1. This is particularly true as the device size increases. A larger rotor diameter increases the sliding velocities on critical valve seals to worsen friction and wear, so that major benefits can be achieved by reducing those velocities by the factor "M", especially for applications involving higher working pressures or higher working temperatures which further exacerbate seal reliability and life issues.

The number "N" of adsorbers in a rotary PSA module of the disclosed embodiments is the product (N=n×M) where "M" is a number of "adsorber sets" which co-operate in a PSA cycle that is defined for "n" adsorbers, and "n" is the number of adsorbers in each adsorber set. In preferred embodiments, n>2. Examples will be described for n=3 and n=6. However, other integer values of "n," such as n=5, also are highly suitable.

If the rotor is rotating at a rotational frequency "f" corresponding to a rotational period "$T_R=1/f$", the cycle period "T" of the pressure swing adsorption cycle will be determined as $T=T_R/M$. The present invention applies to any integer value of M>1. Hence "M" is the multiple by which the rotational period is increased for given "T". For very rapid PSA cycles with short period "T" of the order of one second or less, it is desirable to reduce the rotational frequency so as to reduce seal friction and wear.

The described embodiments facilitate the reduction of rotational frequency if desired by a relatively large multiplier "M", more than proportionately reducing the power required to operate the rotor against frictional resistance of seals, and greatly extending the life of critical seals. The described embodiments entirely overcome the problems of extremely complex external piping connections and possibly imbalanced flow that would be expected in multiplying the total number of valves requiring external connections by the multiple "M". The described embodiments furthermore enable highly compact PSA devices as may be required for enrichment of oxygen and purification of hydrogen for automotive, fuel cell power plants. The described embodiments also address the problems of how to achieve uniform loading of compressors and/or vacuum pumps coupled to a high frequency PSA process, how to achieve high process performance in terms of product purity and yield, and how to achieve high overall energy efficiency of the process.

The described PSA processes establish the PSA cycle in each adsorber set, within which the total working pressure in each adsorber is cycled between a higher pressure and a lower pressure of the PSA cycle. The higher pressure is typically elevated above atmospheric, and the lower pressure is lower than that of the higher pressure, and may conveniently either be atmospheric or subatmospheric. The PSA process also provides intermediate pressures between the higher and lower pressure. The compression machinery of the apparatus in general includes a feed fluid compressor and a heavy product fluid exhauster. The exhauster may be a vacuum pump when the lower pressure is subatmospheric. When the lower pressure is atmospheric, the exhauster could be an expander, or else may be replaced by throttle means to regulate countercurrent blowdown.

With the described embodiments, the feed compressor typically supplies feed fluid for feed pressurization of the adsorbers to a first valve. The exhauster typically receives heavy product fluid for countercurrent blowdown of the adsorbers from the first valve.

A buffer chamber may be provided to co-operate with the second valve. The buffer provides the "light reflux" function of accepting a portion of the fluid enriched in the second component as light reflux fluid from a bed at the higher pressure and during cocurrent blowdown to reduce the pressure from the higher pressure. The buffer chamber also stores that fluid for a brief interval, and then returns that fluid to the same adsorbent bed to provide purge at the lower pressure or to provide light reflux pressurization to increase the pressure from the lower pressure. The light reflux function enables production of the light product with high purity.

For the examples of n=3 and n=6, described embodiments perform, for each adsorber set, the sequentially repeated steps within the cycle period as follows, while setting time "t" to start from zero at the beginning of the cycle period "T":

(A) Feed pressurization and production. Feed fluid mixture is admitted to the first end of the adsorber set during a feed time interval over approximately ⅓ of the cycle period (0<t<T/3), commencing when the pressure within the adsorber set is a first intermediate pressure between the lower pressure and the higher pressure, pressurizing the adsorber set to the higher pressure (step A1, 0<t<T/6 approximately), and then delivering light product fluid from the second end (step A2, T/6<t<T/3 approximately) at a light product delivery pressure which is substantially the higher pressure less minor pressure drops due to flow friction.

(B) Withdrawing from the second end a first light reflux fluid enriched in the second component (at about the end of step A2 of light product delivery) at approximately the higher pressure during a brief time interval at or near the end of step A (T/3).

(C) Equalization to buffer for n=3, or directly to another adsorber set in 180° opposite phase for n=6. While flow at the first end of the adsorber set is stopped during a cocurrent blowdown time interval following step B, withdrawing a second light reflux fluid enriched in the second component as light reflux fluid from the second end of the adsorber set into the buffer, and depressurizing the adsorber set toward a second intermediate pressure between the higher pressure and the lower pressure, over a time within the interval T/3<t<T/2.

(D) Withdrawing a third light reflux fluid from the second end as purge flow for another adsorber set, during a brief time interval at about the end of step C (T/2).

(E) Countercurrent blowdown and exhaust. Exhausting a flow of fluid enriched in the first component from the first end of the adsorber set during an exhaust time interval (T/2<t<5T/6), in step E1 (T/2<t<2T/3) to depressurize the adsorber set from the second intermediate pressure to the lower pressure, and then in step E2 (2T/3<5T/6) transferring a flow of third light reflux fluid from the second end of another adsorber set (whose phase is lagging by 120°) undergoing step D to purge the adsorber set at substantially the lower pressure while continuing to exhaust fluid enriched in the first component as a heavy product fluid.

(F) Equalizing from buffer for n=3, or directly from another adsorber set (in 180° opposite phase) undergoing step C for n=6. While flow at the first end of the adsorber set is stopped, second light reflux fluid repressurizes the adsorber set from substantially the lower pressure to the second intermediate pressure over a time within the interval 5T/6<t<T.

(G) At about t=T, admitting a flow of first light reflux fluid directly from the second end of another adsorber set (whose phase is leading by 120°) undergoing step B as backfill fluid to increase adsorber pressure to the first intermediate pressure for the beginning of step A of the next cycle.

It will be appreciated by those or ordinary skill in the art that alternative light reflux flow patterns may be used. For example, some or all of the first light reflux fluid from step B could be used to purge another adsorber set during step E. Another variation would be to delete steps B and G, or delay step B to follow step A rather than overlap step A so it acts as a pressure equalization step.

The process may be controlled by varying the cycle frequency so as to achieve desired purity, recovery and flow rates of the light product fluid. Alternatively, the feed flow rate and the light product flow rate may be adjusted at a given cycle frequency, so as to achieve desired light product purity. Preferably, light product flow rate is adjusted to maintain delivery pressure in a light product receiver, by simultaneously varying feed compressor drive speed and the rotational frequency of the PSA module.

In vacuum embodiments for oxygen enrichment from air, the first intermediate pressure and second intermediate pressure are typically approximately equal to atmospheric pressure, so that the lower pressure is subatmospheric (e.g. about 0.3 to 0.5 bars absolute, while the higher pressure may be in the range of 1.5 to 3 bars absolute). Alternatively, in positive pressure embodiments the lower pressure may be atmospheric. In air purification applications, the first component is an impurity fluid or vapour, the fluid mixture is air containing the impurity, and the light product is purified air. For air separation applications, the fluid mixture is air, the first component is nitrogen, the second component is oxygen, the adsorbent material includes a nitrogen-selective zeolite, the light product is a fluid enriched in oxygen, and the heavy product is a fluid enriched in nitrogen. Product purity depends on a number of factors, including both operating parameters, such as cycle speed, operating pressures, operating temperatures, zeolites, etc., and output requirements, such as hydrogen purity required for feed to a fuel cell or purity of medical oxygen for a medical patient. The light product purity for air separation typically is at least 80%+oxygen, preferably 90%+ oxygen, and even more preferably 95%+ oxygen.

II. Detailed Apparatus Description With Reference To Drawings

A PSA apparatus 10 as shown in FIG. 1 has an adsorber rotor engaged with a stator mutually defining a rotary axis 12. The adsorber rotor includes a number "N" of adsorbers 14 mounted between a first rotor plate 16 and a second rotor plate 18, mutually attached by tie rods 20 and rotor cover 22. The rotor is driven by a motor 24 coupled to the first rotor plate by shaft 26.

The stator includes a first stator portion 28 and a second stator portion 30, which are mounted in a fixed alignment relative to axis 12. The first stator portion 28 includes a feed manifold chamber 32 annularly disposed about the axis 12, and an exhaust manifold chamber 34 likewise annularly disposed about axis 12. A feed conduit 36 connects the feed manifold chamber 32 to an external fluid feed supply, such as a compressor. An exhaust conduit 38 connects the exhaust manifold chamber 34 to an external exhaust, such as a vacuum pump (if the lower pressure is subatmospheric), to atmospheric discharge, or to other disposal for the second product. The second stator portion 30 is connected to a light product delivery conduit 40, with the illustrated feed delivery conduit centrally disposed on the axis 12.

Each of the adsorbers 14 has a flow path contacting adsorbent material between first end 42 and second end 44, respectively sealingly connected to the first and second rotor plates 16 and 18. A first valve face 46 is defined between mutually sealing faces of the first stator portion 28 and the first rotor plate 16. A second valve face 48 is defined between mutually sealing faces of the second stator portion 30 and the second rotor plate 18. The first end 42 of each adsorber element 14 is in fluid communication with the first valve face 46 by a first aperture 50 penetrating the first rotor plate 16. The second end 44 of each adsorber element 14 is in fluid communication with the second valve face 48 by a second aperture 52 penetrating the second rotor plate 18.

In the particular embodiment of FIG. 1, the adsorbers 14 are formed of a sheet material supporting the adsorbent. Spacers define flow channels along the flow path. The sheet material is wound around a cylindrical core 54 to form a spiral roll 56 of adsorbent extending between the first and second ends 42, 44 of the adsorber element 14. Spiral roll 56 is sealingly inserted in a containment tube 58, which is sealingly engaged with matching cavities in the first and second rotor plates 16 and 18. Adsorbers 14 may have alternative structures, such as a single roll as illustrated by FIG. 13 and is discussed further herein.

Figure 2:
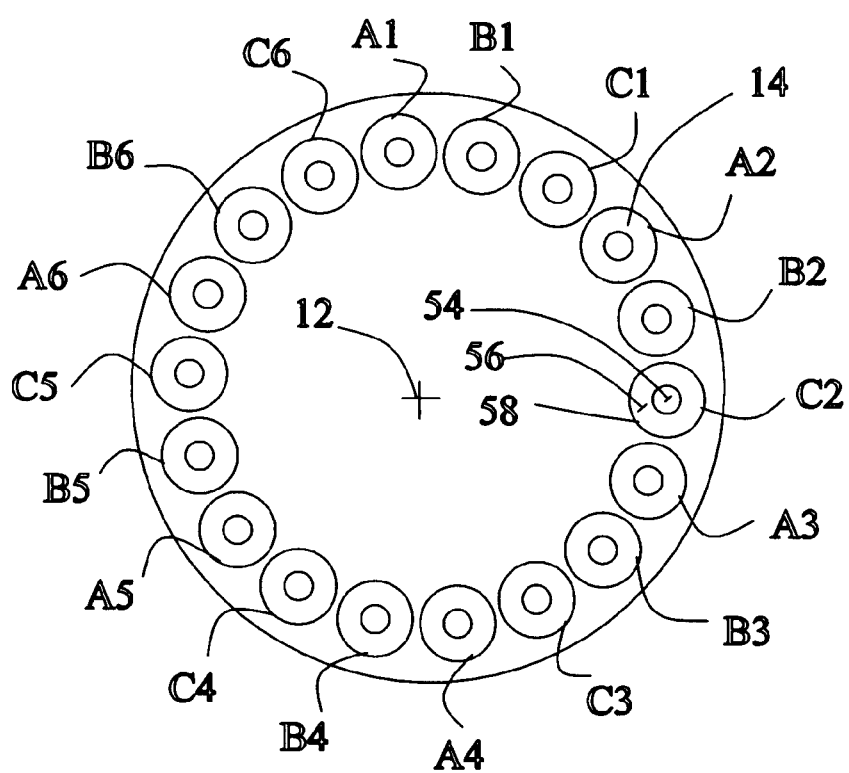
FIG. 2 is a cross sectional view of the apparatus of FIG. 1 taken along line 2—2 with n=3 and M=6 for N=18 adsorber elements.

FIG. 2 is a cross sectional view of the apparatus of FIG. 1 taken along lines 2—2 illustrating the adsorbers 14 annularly disposed in a single ring about the axis 12. There are n=3 adsorber sets (A, B and C) each comprising m=6 adsorbers 14 (A1, B1, C1, A2, B2, C2, A3, B3, C3, A4, B4, C4, A5, B5, C5, A6, B6, and C6) for a total of 18 adsorbers. The PSA cycle is performed in the three adsorber sets, with a phase shift of 120° between the beds in the sequence of adsorber sets A, B and C.

The adsorbent sheets comprise a reinforcement material, in particular embodiments glass fibre, metal foil or wire mesh, to which the adsorbent material is attached with a suitable binder. As shown in FIG. 1, an adsorber 14, such as the illustrated adsorber laminate roll, may have: a single adsorbent material throughout; may have homogeneous or heterogeneous combinations of adsorbent materials throughout or within a particular zone; or may have separate zones with each zone having a different adsorbent material. The illustrated adsorber 14 has a first zone 60 adjacent first end 42, and a second zone 62 extending to second end 44. First zone 60 contains a first adsorbent material, such as a desiccant, one example of which is activated alumina. The second zone 62 typically contains a second adsorbent material, such as a zeolite adsorbent. For this arrangement, zone 60 extends over about 15% of the flow channel length between the first and second ends 40 and 42, and zone 62 (which may in turn be subdivided into a plurality of zones containing different adsorbents) comprises the remaining 85%. For air separation to produce enriched oxygen, typical adsorbents in second zone 62 include types X, A or chabazite zeolites, typically exchanged with lithium, calcium, strontium, magnesium and/or other cations, and with optimized silicon/aluminium ratios as well known in the art. The zeolite crystals are bound with silica, clay and other binders, or self-bound, within the adsorbent sheet matrix.

Figure 13:
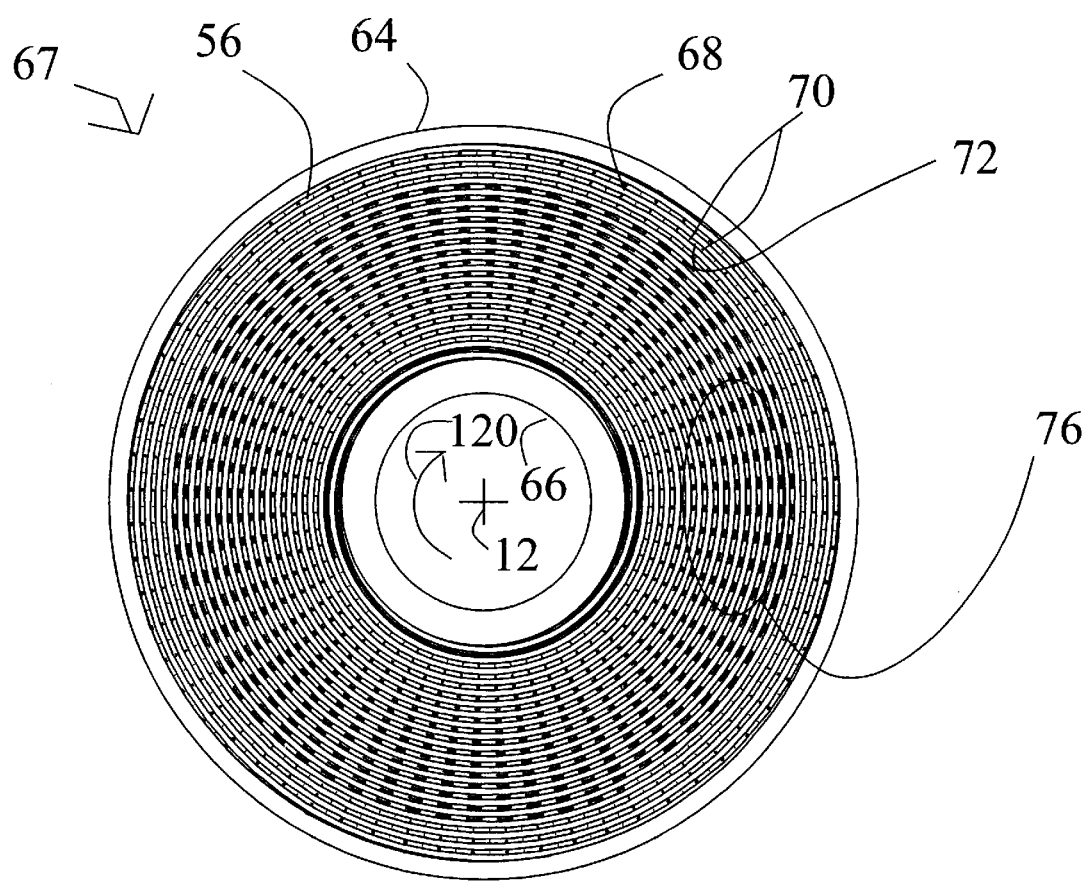
FIG. 13 is a cross sectional view of a one embodiment of a spirally wound adsorbent laminate sheet.

FIG. 13 shows a single adsorbent laminate roll 56 formed between outer wall 64 and inner wall 66 of the adsorber housing 67 for use particularly with continuous systems. The adsorbent laminate roll 56 is formed of a spirally rolled adsorbent sheet 68, with spacers 70 between the sheets to define fluid flow channels 72 in the axial direction while preventing transverse flow between the flow channels. The spacers 70 extend axially between the first and second ends 42 and 44 so as to define flow channels 72 serving as distinct adsorbers.

Satisfactory adsorbent sheets 68 have been made by coating a slurry of zeolite crystals with binder constituents onto the reinforcement material, with successful examples including nonwoven fibreglass scrims, woven metal fabrics, and expanded aluminium foils. Spacers 70 are provided by printing or embossing the adsorbent sheet 68 with a raised pattern, or by placing a fabricated spacer 70 between adjacent pairs of adsorbent sheets. Alternative satisfactory spacers have been provided as woven metal screens, non-woven fibreglass scrims, and metal foils with etched flow channels in a photolithographic pattern.

Figure 14:
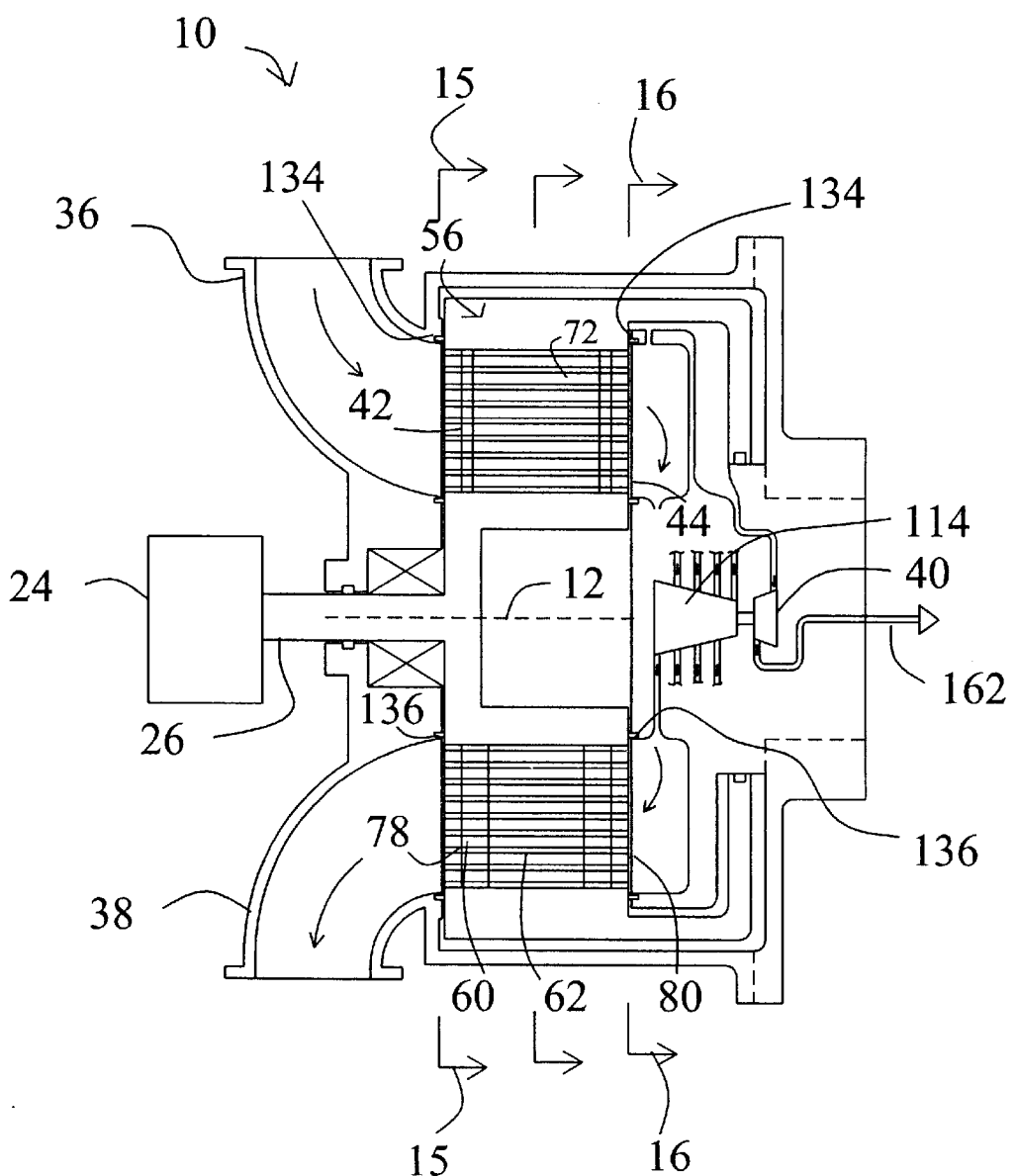
FIG. 14 is an axial section view illustrating one embodiment of a rotary PSA apparatus with M=1 and having a spirally wound adsorber directly ported to valve faces.

One important improvement provided by the present invention is adsorbers 14 having reinforced channels for directly porting to first valve face 46 and/or second valve face 48. These adsorbers can be used with various PSA apparatuses, including an apparatus having layered and/or interpenetrating manifolds as illustrated by FIG. 1. However, such adsorbers also can be used with other embodiments of a PSA apparatus, as illustrated by FIG. 14. FIG. 14 shows flow channels 72 being directly ported into the first valve face 46 and second valve face 48. Narrow densified zones 78 and 80 of the adsorbent laminate roll respectively terminate the first and second ends 42 and 44 of the flow channels 72 so as to enhance wear and leakage resistance in the valve faces. Zones 78 and 80 may be filled with a filler material, e.g. an inert ceramic material, a polymeric material, a metal or alloy material, or mixtures of such materials. Spirally wound metallic strips also may be used to connect the spacers 70, while maintaining open fluid communication of the flow channels 72 to valve faces, and also maintaining closely identical flow resistance of the channels to high accuracy so as to avoid channelling.

Narrow densified end zones 78 and 80 of the adsorbent laminate roll respectively terminate the first and second ends 42 and 44 of the flow channels 72 so as to enhance wear and leakage resistance in the valve faces. Reinforcement and/or densification may be achieved by impregnation of end zones 78 and 80 with a suitable substance for hardening the ends of the adsorbent sheets, for example a silicate rigidizer, a water glass or a thermoset plastic compound. Zones 78 and 80 may also be reinforced by providing a filler to narrow the channels in the end zones (and thus increase the cross-sectional area of solid material to provide improved resistance to wear from rubbing abrasion or fluid erosion in the valve face between the rotor and stator, and also to reduce leakage flows in the valve face). The filler material for the channels in the end zones may be an inert ceramic material, a polymeric material, a pyrolytic carbon, a metal or alloy material, or mixtures of such materials. A ceramic filler material may be introduced as a clay precursor material prior to firing. A thermoset plastic polymer filler may be used for applications whose adsorbents do not need high temperature activation, or may be converted to coke or pyrolytic carbon during the firing process for activation of adsorbents that are activated at elevated temperature. Spirally wound metallic strips in end zones 78 and 80 (and terminated in the valve face so as to provide durability for wear and leakage resistance) also may be used to connect the spacers 70, while maintaining open fluid communication of the flow channels 72 to valve faces, and also maintaining closely identical flow resistance of the channels to high accuracy so as to avoid channelling.

Figure 4:
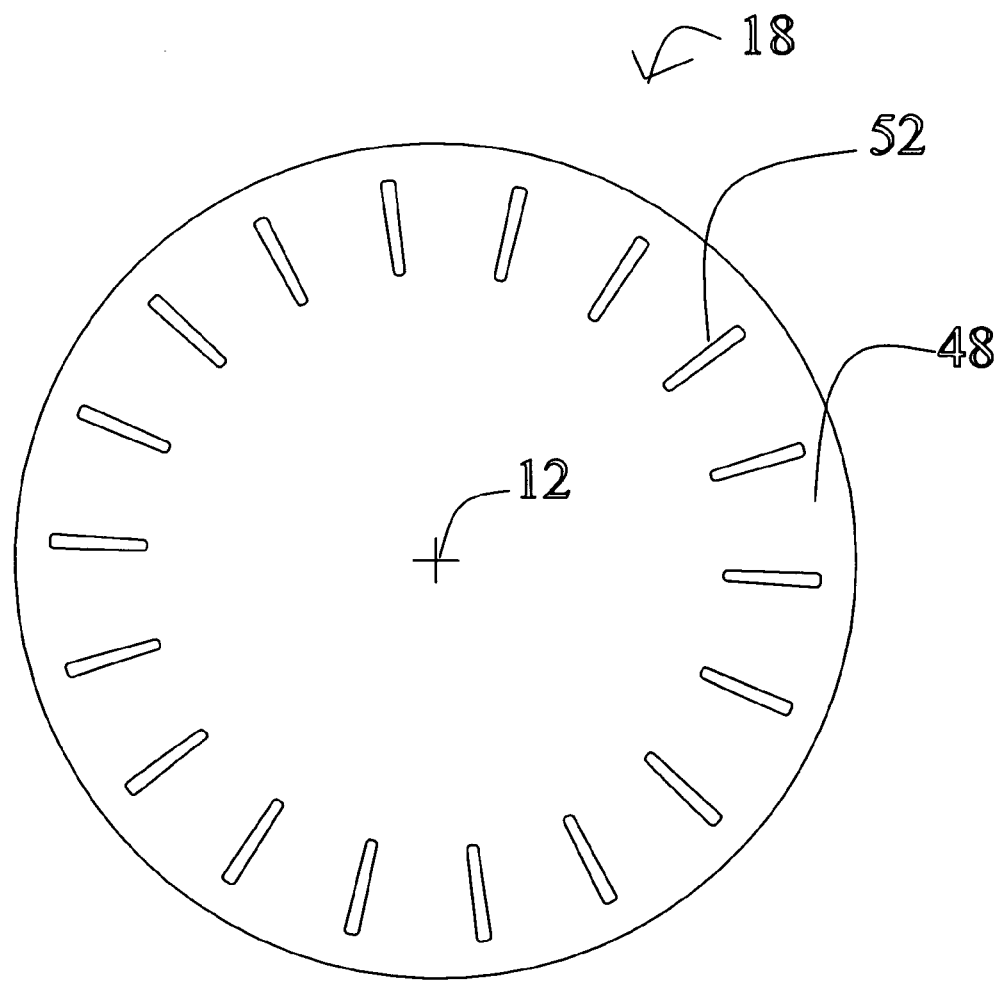
FIG. 4 is a cross sectional view of the apparatus of FIG. 1 taken along line 4—4 for embodiments having n=3 and M=6 for N=18 adsorber elements.
Figure 5:
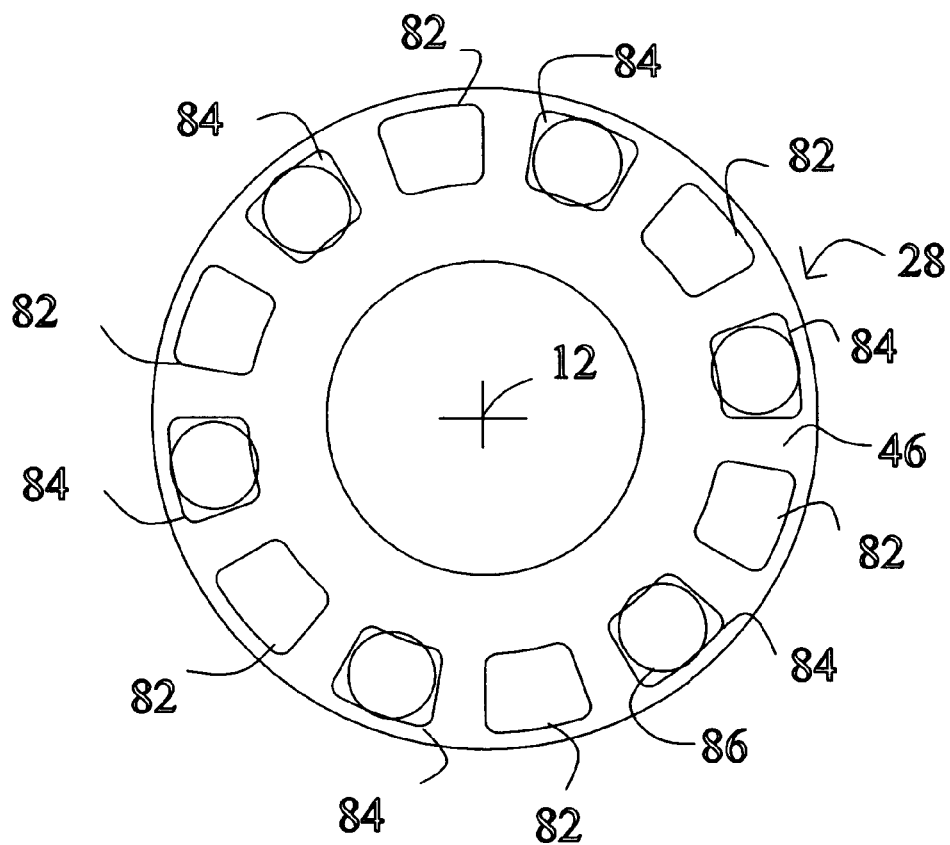
FIG. 5 is a cross sectional view of the apparatus of FIG. 1 taken along line 5—5.

FIGS. 4–7 are cross sectional views of the apparatus illustrated by FIG. 1. FIG. 4, a cross sectional view of the apparatus of FIG. 1 taken along line 4—4, illustrates the second apertures 52 of the second rotor plate 18 in the second valve face 48. Equivalently, FIG. 5 shows the feed ports 82 and the exhaust ports 84 of the first stator portion 28 in the first valve face 46. Since m=6, these ports for the first functions of feed and exhaust are provided in sets of six ports, each separated by angular spacing of 360°/6=60°.

Figure 6:
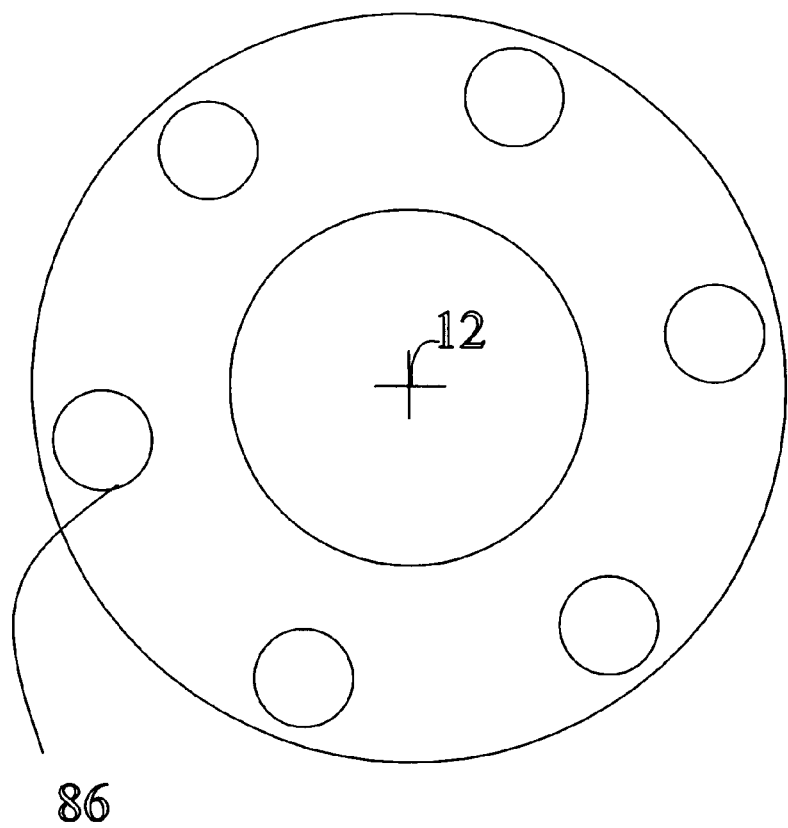
FIG. 6 is a cross sectional view of the apparatus of FIG. 1 taken along line 6—6 for embodiments having n=3 and M=6 for N=18 adsorber elements.

FIG. 6 is a cross sectional view of the apparatus of FIG. 1 across the feed manifold 32 taken along line 6—6. FIG. 6 shows transfer conduits 86 by which the exhaust ports 84 communicate to the exhaust manifold 34 interpenetratingly with the feed manifold 32. By providing layered, annular manifolds concentric with the axis 12 for the first functions, good flow distribution is achieved to the adsorbers 14 comprising a single adsorber set connected to the corresponding function (feed or exhaust) at any instant.

Figure 7:
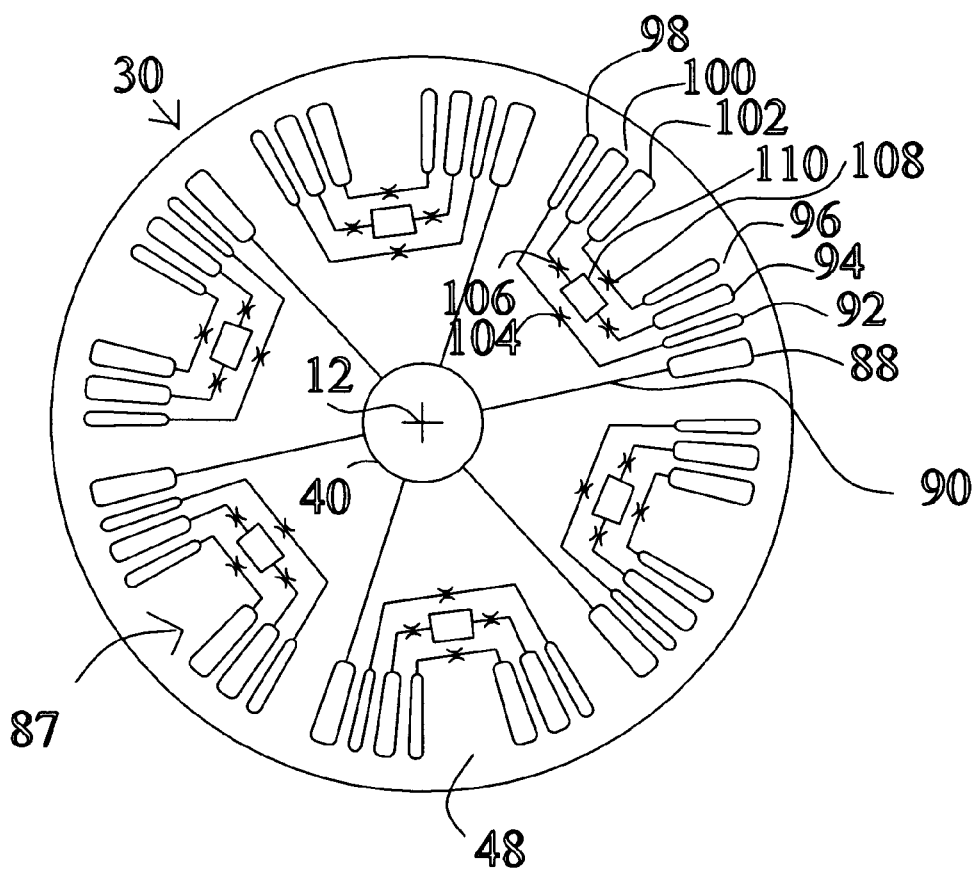
FIG. 7 is a cross sectional view of the apparatus of FIG. 1 taken along line 7—7 for embodiments having n=3 and M=6 for N=18 adsorber elements.

FIG. 7 is a cross sectional view of the apparatus 10 of FIG. 1 taken along line 7—7. FIG. 7 illustrates second function ports in the second valve face 48 within the second stator portion 30. FIG. 7 illustrates function ports for three light reflux stages. The second functions depicted are light product delivery, light reflux withdrawal from the adsorbers 14, and light reflux return to the adsorbers. For this embodiment, within each angular sector of 360°/6=60° about the axis 12, the second valve function ports include: a light product delivery port 88 communicating to light product delivery conduit 40 via fluid conduit 90; a first light reflux exit port 92; a second light reflux exit port 94; a third light reflux exit port 96; a first light reflux return port 98; a second light reflux return port 100; and a third light reflux return port 102. Fluid communication between each pair (first, second and third) of light reflux exit ports (92, 94, 96) and return ports (98, 100, 102) is provided as fluid conduits 104, 106 and 108, within the second stator portion 30. Each fluid conduit 104, 106 and 108 includes pressure letdown means, such as an orifice, for the respective light reflux gas. The illustrated embodiment includes a buffer chamber 110 for the second light reflux gas.

The first, second and third light reflux gases have descending light component purities. They are withdrawn from the adsorbers 14 in the order of descending purity, and then returned in the reverse order of ascending purity. Consequently, the light reflux is stratified so as to maintain superior purity of the light product.

Figure 8:
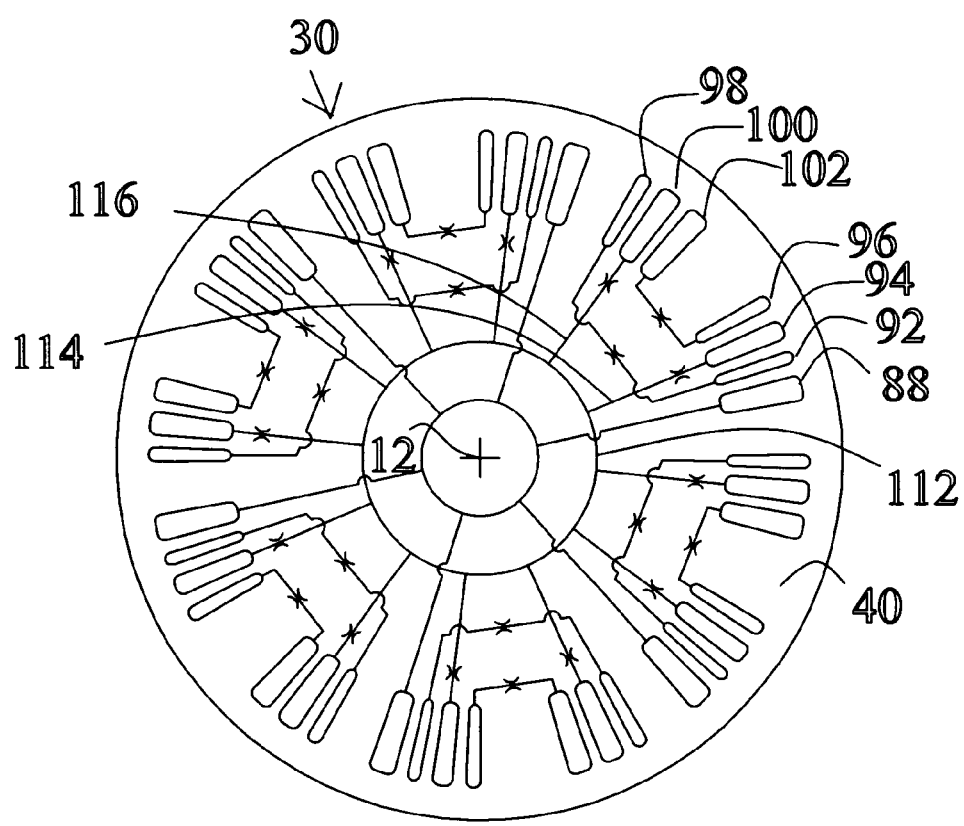
FIG. 8 is a cross sectional view of an apparatus according to FIG. 1 taken along line 7—7 having a centrally located buffer chamber and for embodiments having n=3 and M=6 for N=18 adsorber elements.
Figure 9:
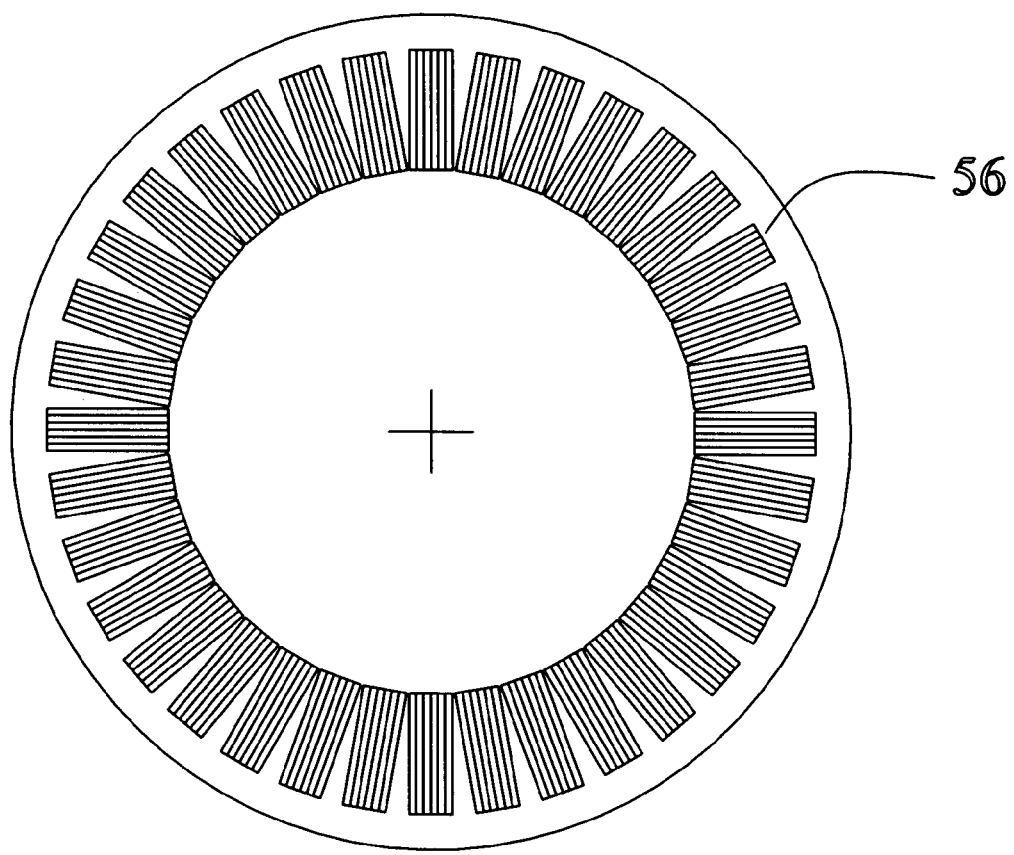
FIG. 9 is a cross sectional view of the apparatus of FIG. 1 taken along line 9—9 with n=6 and M=6 for N=36 adsorber elements.

FIG. 8 is a cross sectional view illustrating the same section as FIG. 7 but of an alternative embodiment of the apparatus 10 of FIG. 1. FIG. 9 illustrates an alternative arrangement with a single, centrally located buffer chamber 112 that may be installed in the central cavity of the rotor, instead of providing separate buffer chambers 110 for each of the "M" angular sectors. Central buffer chamber 112 communicates to each of the "M" second light reflux exit ports 94 by a fluid conduit 114, and to each of the "M" second light reflux return ports 100 by a fluid conduit 116.

Figure 15:
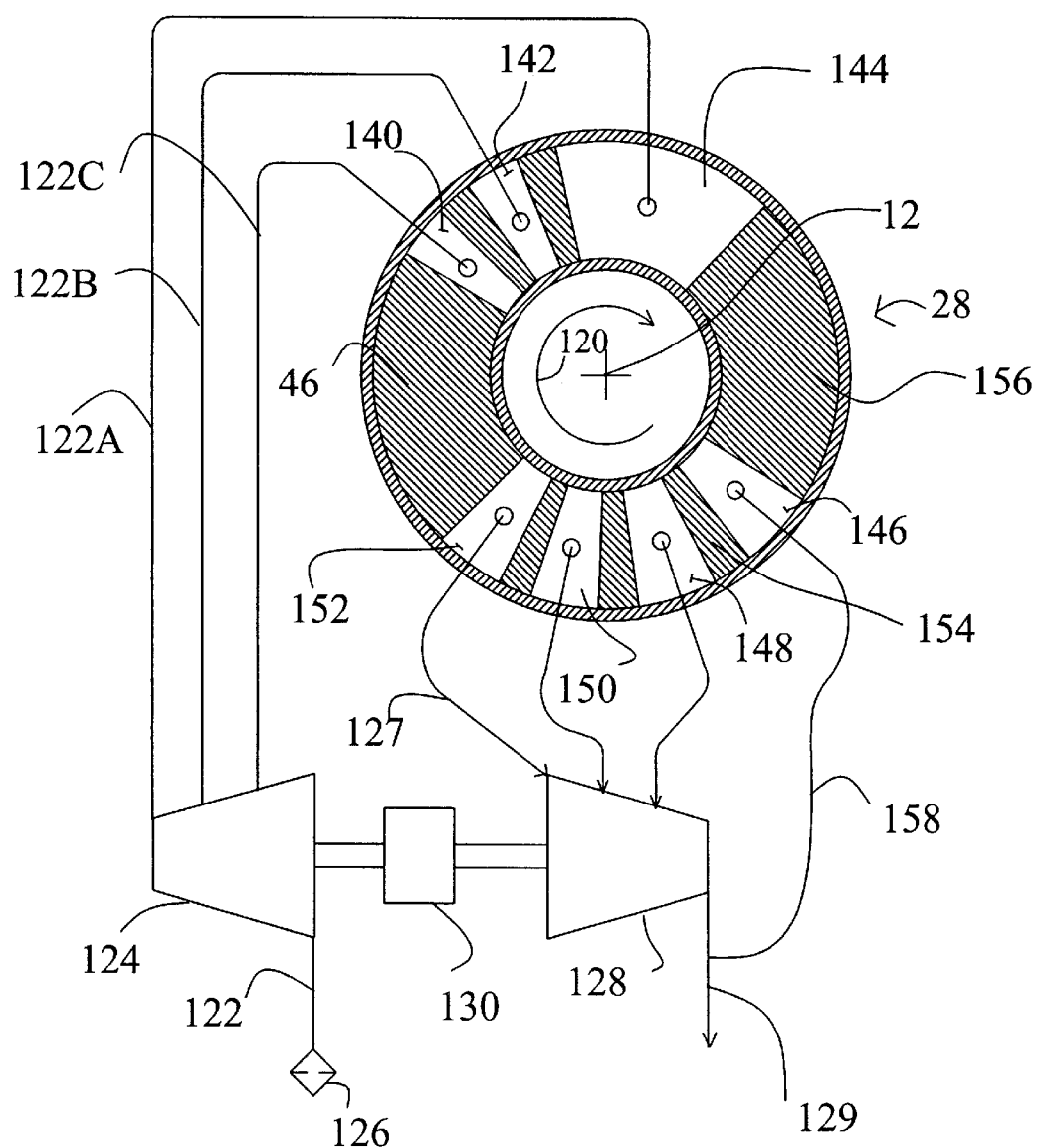
FIG. 15 is a cross sectional view of the apparatus illustrated in FIG. 14 taken along line 15—15 for an embodiment with M=1.
Figure 16:
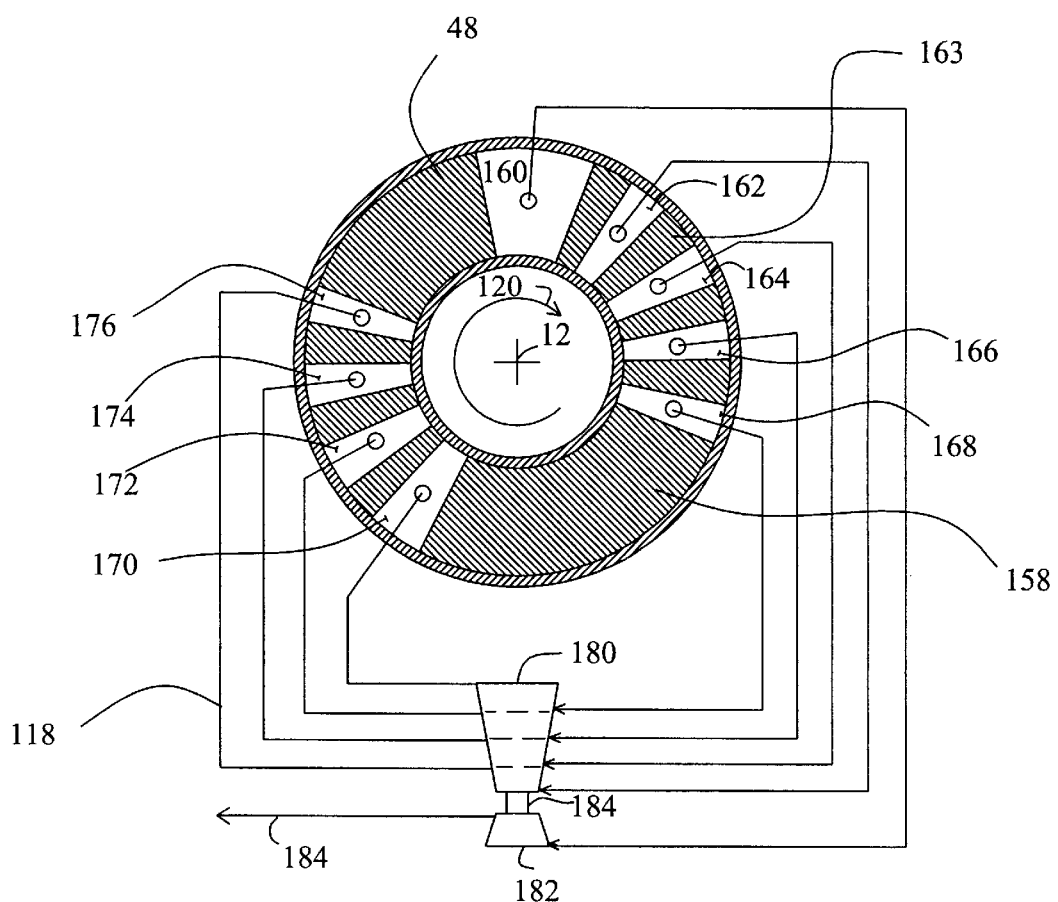
FIG. 16 is a cross sectional view of the apparatus illustrated in FIG. 14 taken along line 16—16 for an embodiment with M=1.

In the embodiment illustrated by FIGS. 15–16, flow channels 72 through the adsorbers are parallel to axis 12. As a result, flow direction is axial. The first valve face 46 and second valve face 48 are shown as flat annular discs normal to axis 12.

Figure 17:
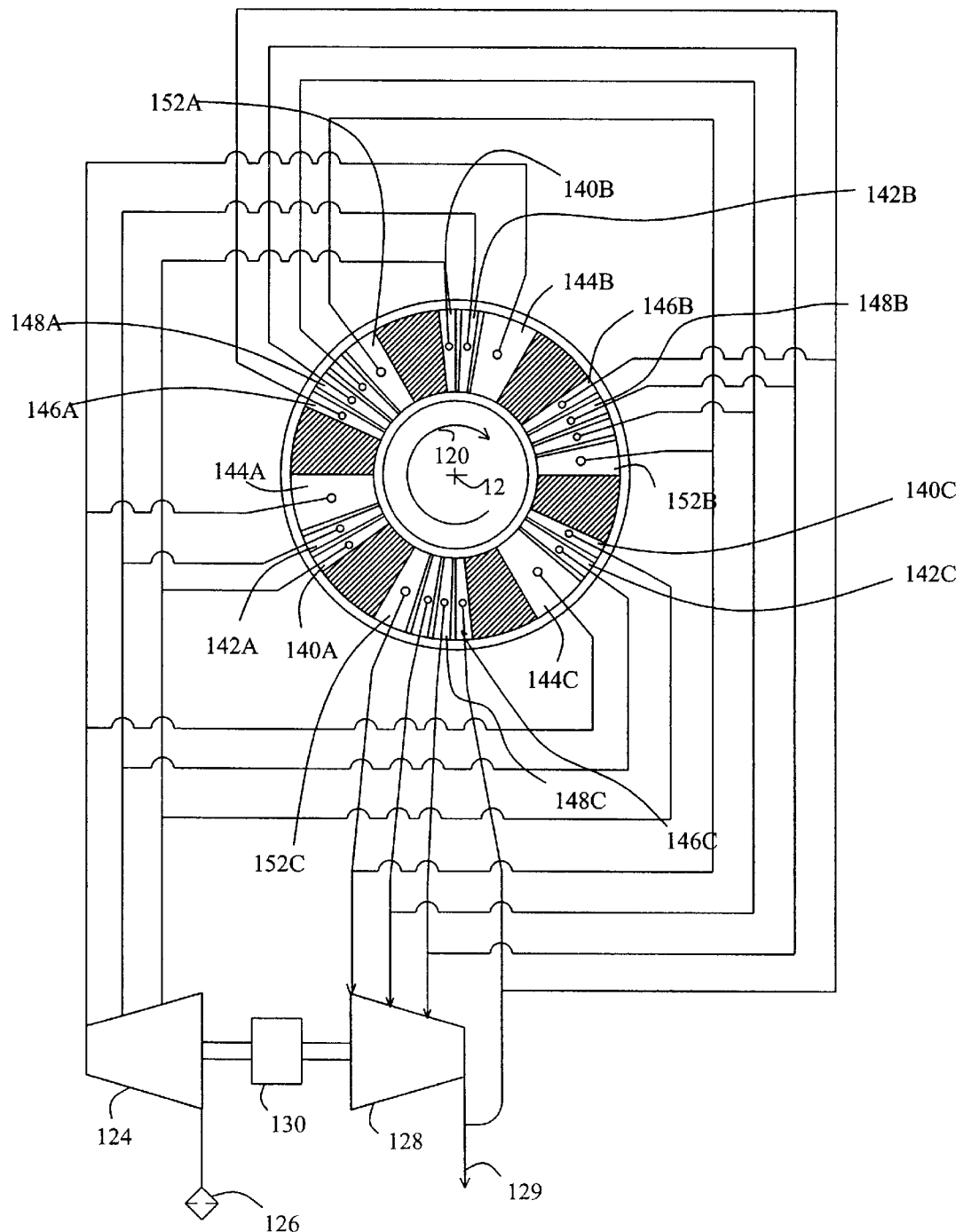
FIG. 17 is a cross sectional view of the apparatus illustrated in FIG. 14 for an embodiment with M=3.
Figure 18:
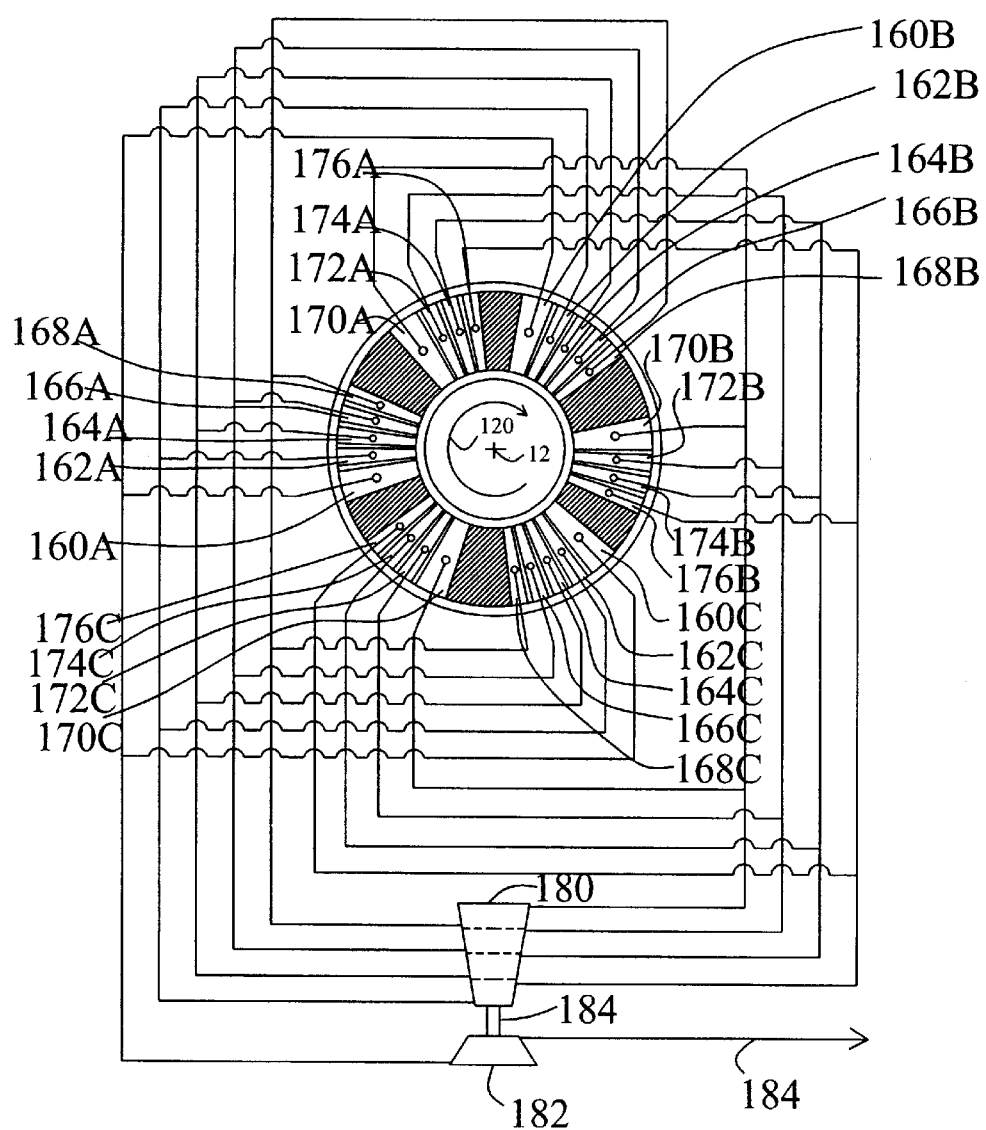
FIG. 18 is a cross sectional view of the apparatus illustrated in FIG. 14 for an embodiment with M=3.

FIGS. 15 and 17 are cross sectional views of PSA module 10 of FIG. 14 taken along lines 15—15. FIGS. 16 and 18 are cross sectional views of module 10 of FIG. 14 along line 16—16. Arrow 120 in each section shows the direction of rotation of the adsorbers about axis 12.

FIG. 15 shows the first stator valve face 46 of the first stator 28. Fluid connection 122 is shown to a feed compressor 124 to induct feed air through inlet filter 126. Fluid conduits to vacuum pump exhauster 128 deliver nitrogen-enriched second product to a second product delivery conduit 129. Compressor 124 and exhauster 128 are shown coupled to a drive motor 130.

In the annular valve face between circumferential seals 134 and 136 (see FIG. 14), the open area of first stator valve face 46 ported to the feed and exhaust ports 82 and 84 is indicated by clear angular segments 140–152 corresponding to the first functional ports communicating directly to functional ports identified by the same reference numerals 140–152. The substantially closed area of valve face 46 between functional ports is indicated by hatched sectors 154 and 156, for example, which are slippers with ideally zero clearance, or in actual practice a narrow clearance to reduce friction and wear without excessive leakage. Typical closed sector 154 provides a transition for an adsorber 14, between being open to port 146 and open to port 148. Gradual opening is provided by a tapering clearance channel between the slipper and the sealing face, so as to achieve gentle pressure equalization of an adsorber 14 being opened to a new port. Much wider closed sectors (e.g. 156) are provided to substantially close flow to or from one end of the adsorbers 14 when pressurization or blowdown is being performed from the other end.

The feed compressor 124 provides feed air to feed pressurization ports 140 and 142, and to feed production port 144 via fluid conduits 122C, 122B, and 122A, respectively. Ports 140 and 142 have successively increasing working pressures, while port 144 is at the higher working pressure of the PSA cycle. Compressor 124 thus may be a multistage or split stream compressor system delivering the appropriate volume of feed flow to each port 140, 142 or 144 so as to achieve the pressurization of adsorbers 14 through the intermediate pressure levels of ports 140 and 142, and then the final pressurization and production through port 144. A split stream compressor system (not shown) may be provided in series as a multistage compressor with interstage delivery ports; or as a plurality of compressors or compression cylinders in parallel, each delivering feed air to the working pressure of port 140, 142 and 144. Alternatively, compressor 124 may deliver all the feed air to the higher pressure, with throttling of some of that air to supply feed pressurization ports 140 and 142 at their respective intermediate pressures.

Similarly, vacuum pump 128 exhausts nitrogen-enriched, heavy product gas from exhaust port 152, which is at the lower pressure of the cycle and from countercurrent blowdown ports 148 at the successively increasing working pressures of those ports. The early countercurrent blowdown stream from port 146 is released at ambient pressure directly to heavy product delivery conduit 129 via fluid conduit 158. Similarly to compressor 124, vacuum pump 128 may be provided as a multistage or split stream machine, with stages in series or in parallel to accept each flow at the appropriate intermediate pressure ascending from the lower pressure.

In other embodiments, the lower pressure is ambient pressure, so that exhauster 128 would be an energy recovery expander. In yet other embodiments, the pressure of an intermediate port 148 could be substantially atmospheric, so that exhauster 128 could be replaced by the combination of a vacuum pump compressing lower pressure exhaust gas from port 150, with this vacuum pump partly or completely powered by an expander expanding early countercurrent blowdown gas from port 146. This combination of a vacuum pump and an expander could be replaced by an ejector with a nozzle fed from port 146 energizing suction from port 152, and the mixed flow from the ejector diffuser being discharged to exhaust conduit 129.

FIG. 16 shows the second stator valve face 48, taken along line 16—16 of FIG. 13. Open ports of the second valve face 48 are second valve function ports 52 communicating directly to a light product delivery port 160; a number of light reflux exit ports 162, 164, 166 and 168; and the same number of light reflux return ports 170, 172, 174 and 176 within the second stator. The second valve function ports 52 are in the annular ring defined by circumferential seals 134 and 136 (see FIG. 14). Each pair of light reflux exit and return ports provides a stage of light reflux pressure letdown, respectively, for the PSA process functions of supply to backfill, full or partial pressure equalization, and cocurrent blowdown to purge.

Illustrating the option of light reflux pressure letdown with energy recovery, a split stream, light reflux expander 180 is provided to provide pressure letdown of four light reflux stages with energy recovery. The light reflux expander 180 serves as pressure let-down means for each of four light reflux stages, each stage having a light reflux conduit respectively between light reflux exit and return ports 162 and 176, 164 and 174, 166 and 172, and 168 and 170 as illustrated.

Light reflux expander 180 is shown coupled to a light product, pressure booster compressor 182 by drive shaft 184. Compressor 182 receives the light product and delivers light product (compressed to a delivery pressure above the higher pressure of the PSA cycle) to delivery conduit 129. Since the light reflux and light product are both enriched oxygen streams of approximately the same purity, expander 180 and light product compressor 182 may be hermetically enclosed in a single housing which may conveniently be integrated with the second stator as shown in FIG. 14. This configuration of a "turbocompressor" oxygen booster without a separate drive motor is advantageous, as a useful pressure boost of the product oxygen can be achieved without an external motor and corresponding shaft seals, and can also be very compact when designed to operate at very high shaft speeds.

Light reflux expander 180 also may be used to power a vacuum pump 128 (or a portion thereof), or alternatively to power rotation of the adsorber rotor. As disclosed by Keefer et al. (U.S. Pat. No. 6,051,050), the light reflux expander 180 may be provided as a single impulse turbine wheel with a separate nozzle for each light reflux stream undergoing pressure letdown.

While the above examples primarily deal with the relatively low pressure and ambient temperature PSA application of oxygen enrichment over nitrogen-selective adsorbents, it will be evident that disclosed embodiments of the invention, or important aspects thereof, may be applied to the full range of PSA applications in commercial use or under research investigation. In particular, the invention applies to hydrogen purification extending up to high working pressures, and to high temperature applications of PSA including direct coupling of PSA to chemical reaction processes.

Figure 10:
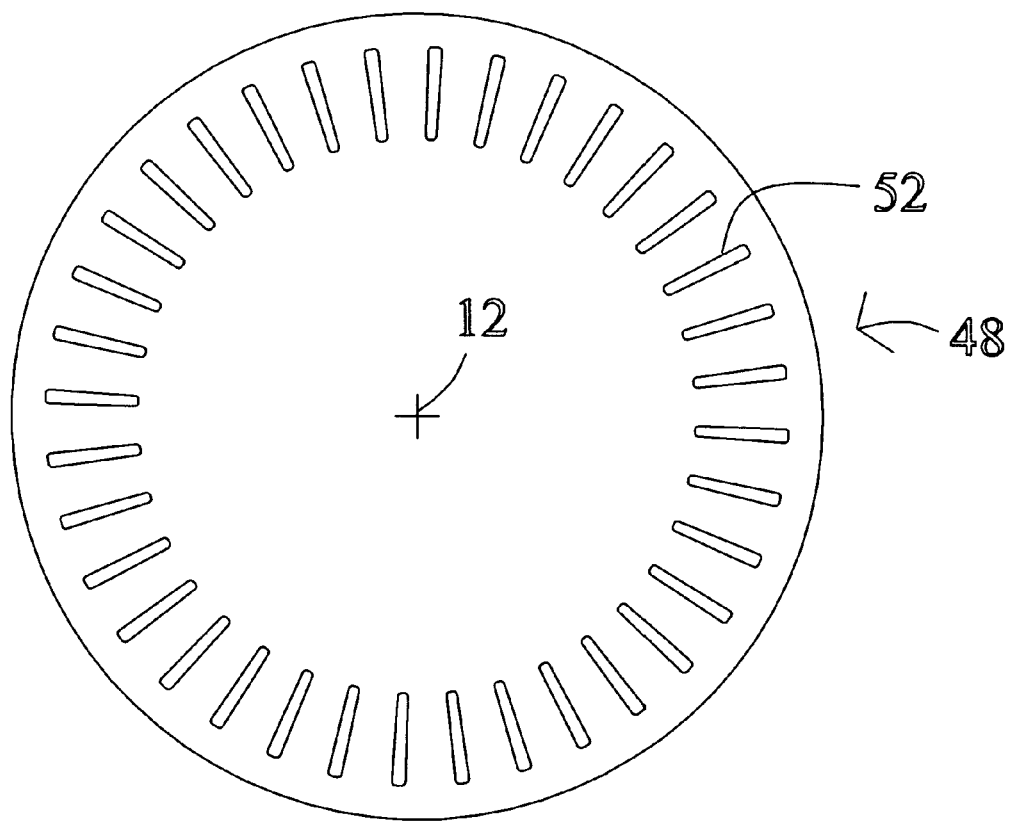
FIG. 10 is a cross sectional view of the apparatus of FIG. 1 with n=6 and M=6 for N=36 adsorber elements.
Figure 11:
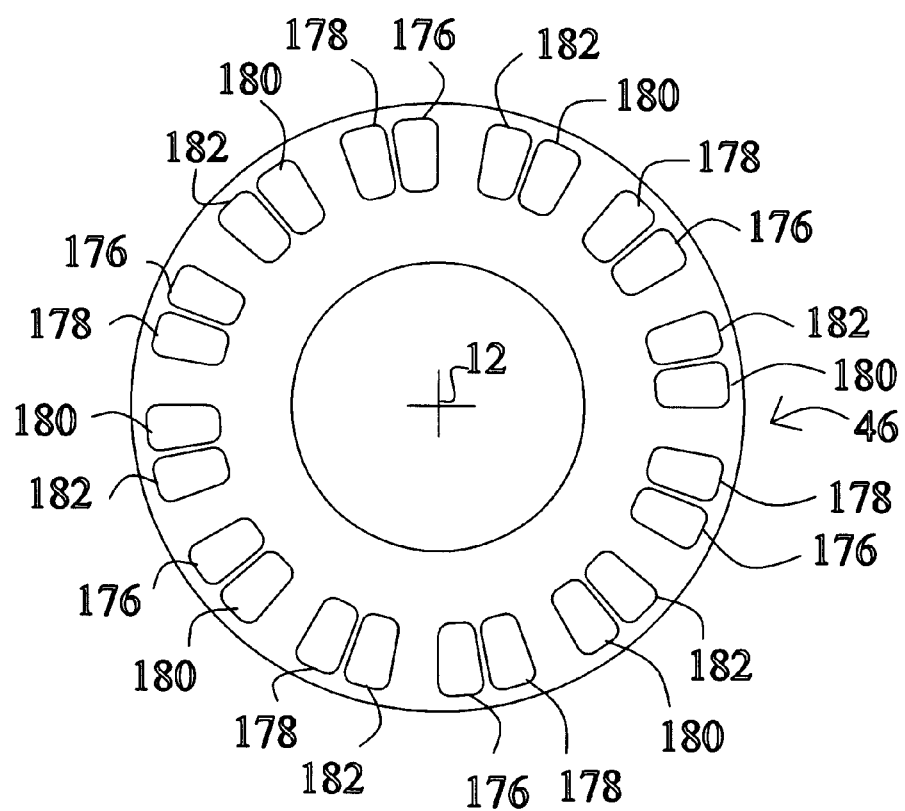
FIG. 11 is a cross sectional view of the apparatus of FIG. 1 taken along line 11—11 with n=6 and M=6 for N=36 adsorber elements.
Figure 12:
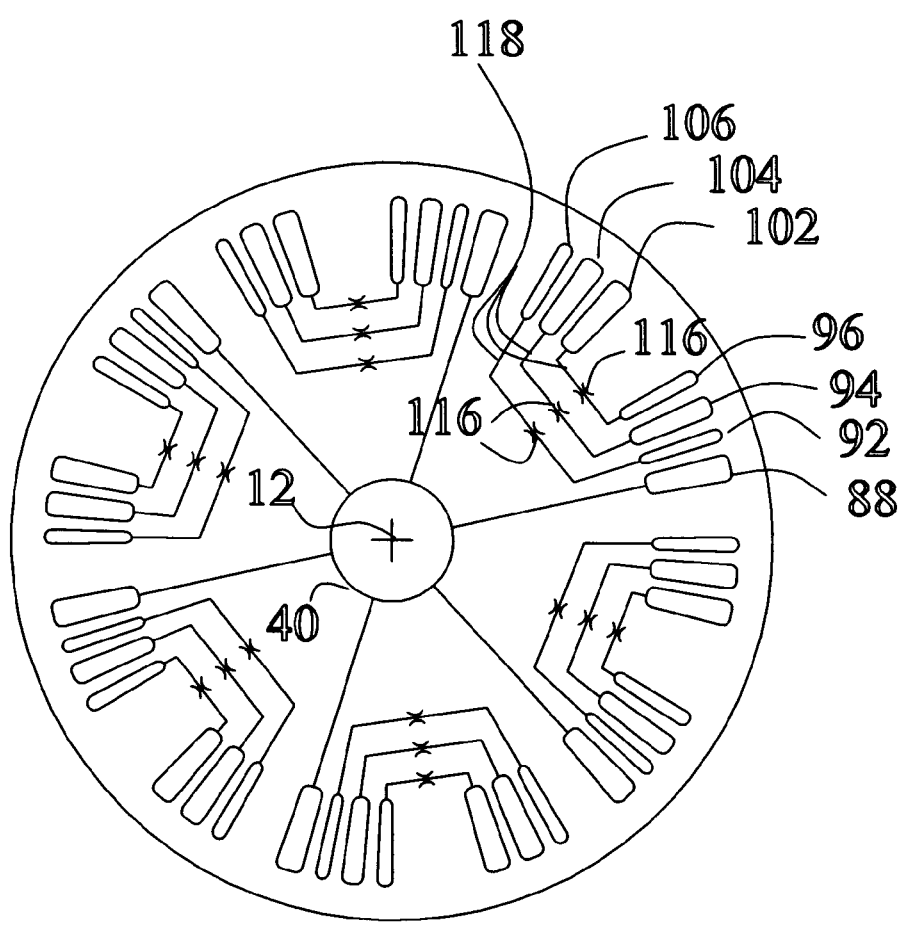
FIG. 12 is a cross sectional view of an embodiment of the apparatus of FIG. 1 taken along line 7—7.

FIGS. 17 and 18 for M=3 correspond to FIGS. 10 and 11 for M=1. Corresponding reference numerals followed by a suffix A, B or C, etc., are used where an item of FIGS. 10 or 11 is replicated in FIGS. 17 or 18.

It also will be appreciated that the "M" second function ports for any other second function could be gathered into a single annular manifold for that function, exactly as illustrated in FIG. 14 for the first functions. This is particularly desirable if the pressure letdown function for light reflux is to be provided by an adjustable throttle or by an energy recovery expander.

Since only one adsorber set is connected to the feed supply means (or to the exhaust means) at any time, except for very brief valve switching intervals, while an adsorber set is always connected to each of those functions, good loading is achieved for a feed compressor or an exhaust vacuum pump performing those functions. The feed manifold 32 can be configured with extended surface walls, so as to provide an aftercooler duty for the feed compressor.

Furthermore, the volume of the feed manifold 32 is minimized so that the delivery pressure of the feed compressor 124 can follow the pressurization of the adsorber set, thus avoiding delivery of feed gas at a higher pressure than actually needed by the adsorber set. The feed compressor 124 therefore is partially unloaded from delivery of feed gas at full pressure during the early portion of each feed interval. Hence, the average delivery pressure of the feed compressor 124 can be reduced, and its power consumption can be reduced significantly compared to a feed compressor delivering the same mass flow of feed gas at continuously the higher pressure of the process.

Similarly, the volume of the exhaust manifold 34 is minimized so that the suction pressure of the vacuum pump can follow the depressurization of the adsorber set, thus avoiding withdrawal of second product gas at a lower pressure than actually released by the adsorber set. The vacuum pump 128 therefore is partially unloaded from operation at full vacuum during the early portion of each exhaust interval. Hence, the power consumption of the vacuum pump 128 can be significantly reduced compared to a vacuum pump exhausting the same mass flow of second product gas at continuously the lower pressure of the process.

Figure 19:
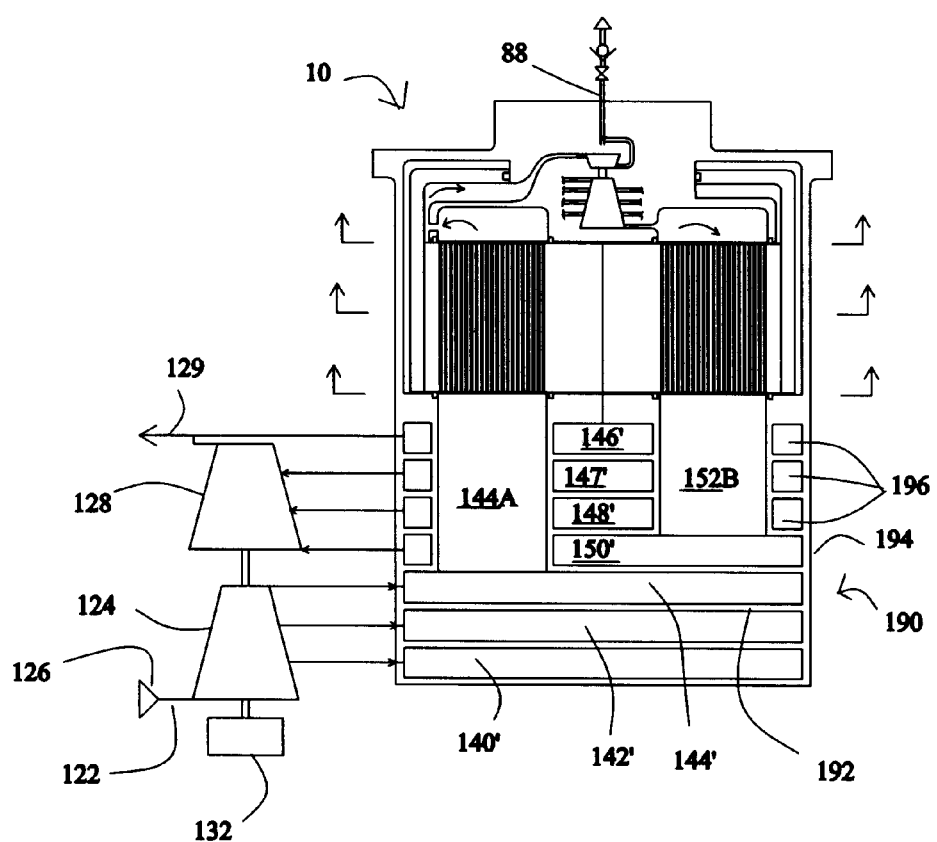
FIG. 19 is a cross sectional view illustrating an embodiment of a PSA apparatus having interpenetratingly layered manifolds.
Figure 20:
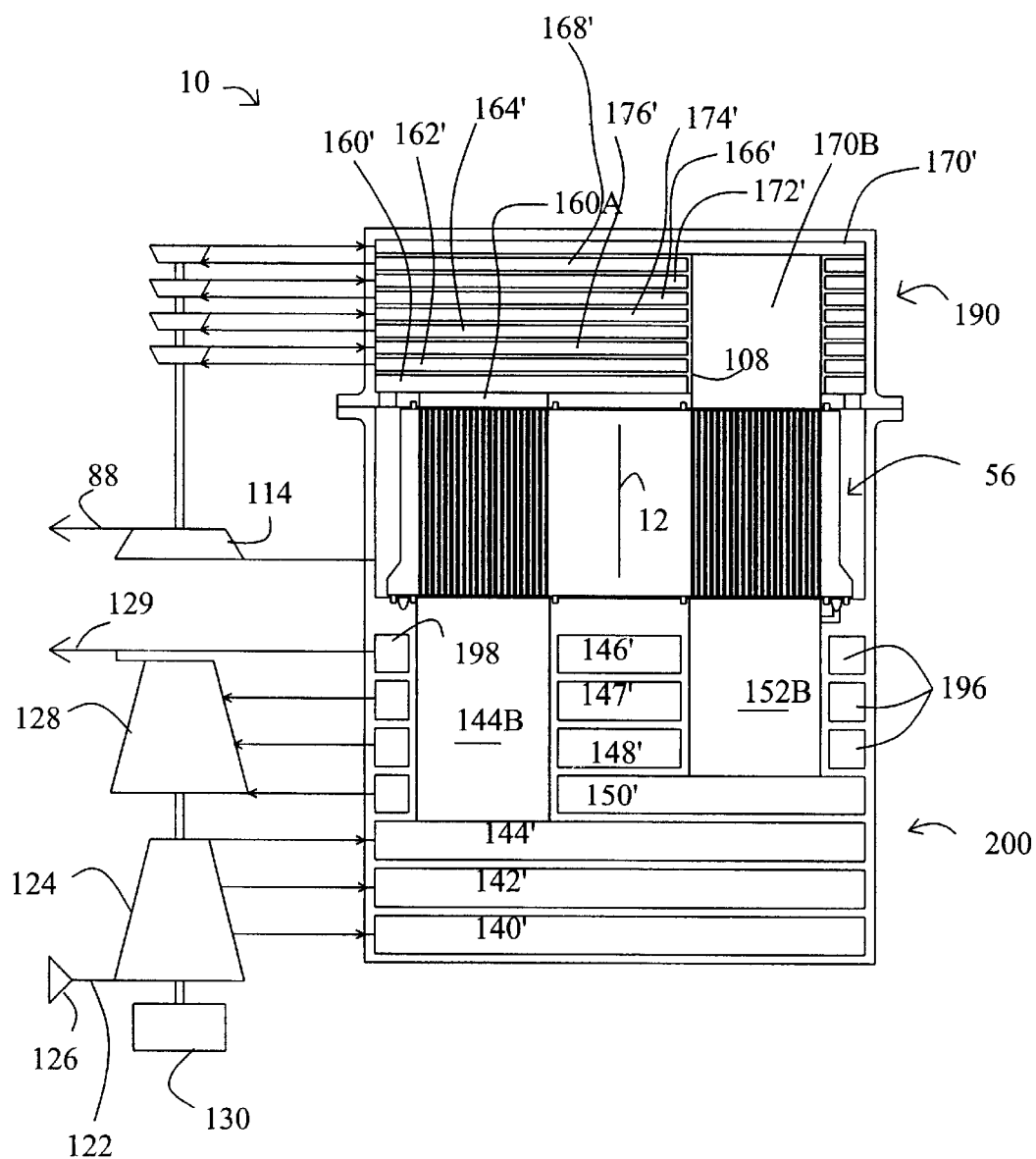
FIG. 20 is a cross sectional view illustrating an embodiment of a PSA apparatus having interpenetratingly layered manifolds.
Figure 21:
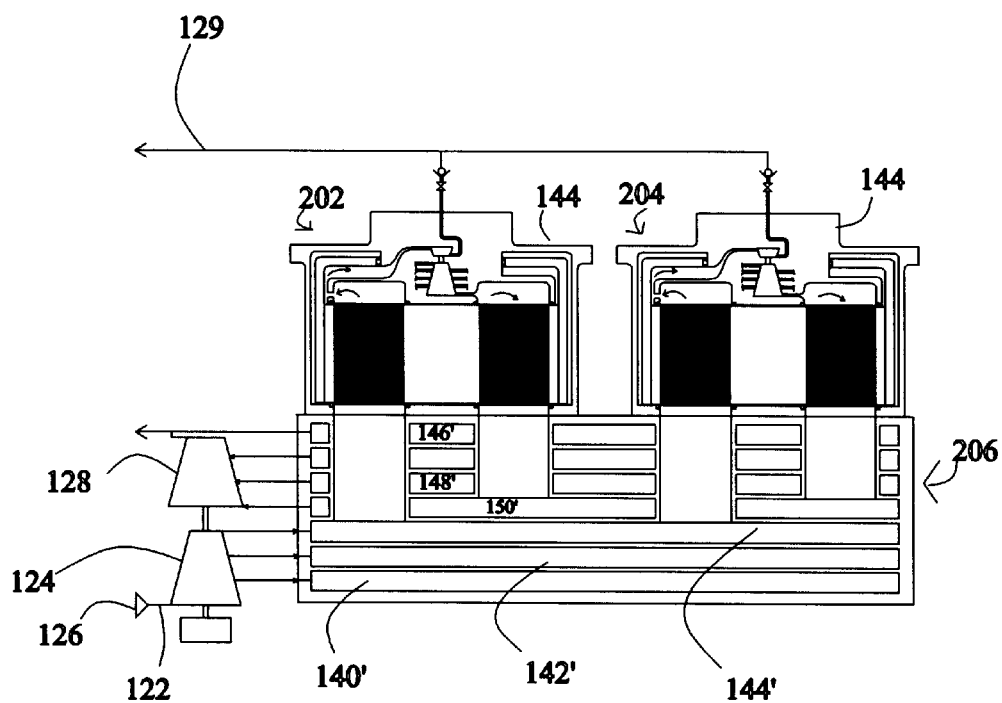
FIG. 21 is a cross sectional view illustrating a multiple module PSA system.

FIGS. 19 through 21 illustrate a rotary PSA module with M=3, having interpenetrating, layered manifolds FIG. 19 shows the use of a layered manifold 190 for connecting all of the feed ports 82 and exhaust ports 140, 142, 144, 146, 148 and 152 in the first valve face 46 to corresponding compression and exhaust stages in accordance with FIGS. 15 and 17. Manifold layers 140', 142', 144', 146', 148' and 150' (using primed reference numerals for the manifold layers corresponding to each feed or exhaust ports) are mutually separated by plates 192 and bounded by external walls 194. Plates 192 may be penetrated by ducts 196, 198, connecting valve face ports to distinct corresponding ports.

The layered manifold 190 may be constructed from welded steel plate, or for low pressure applications from fibre-reinforced plastics for each plate 192 and the interconnecting ducts and the side walls 194.

FIG. 20 shows the further use of a second layered manifold 200 for withdrawing product and light reflux streams from ports 160, 162, 164, 166 and 168 in the second valve face 48, and returning light reflux streams to ports 170, 172, 174, and 176 after pressure letdown. Again, primed reference numerals correlate each manifold layer with the corresponding port, while interpenetrating ducts (e.g. 108) connect each port to the corresponding manifold layer.

FIG. 21 shows two modules 202, 204 mounted on a single layered manifold 206 connecting feed and exhaust flows to a common compressor 124 and vacuum pump 128. The modules 202, 204 are arranged in a row. However, this arrangement clearly may be altered, such as extended to include more modules in the row or more rows of modules in parallel staggered rows.

In other embodiments, the compression machinery may be centrally located in the layered manifold, while the PSA modules may be advantageously arranged in a hexagonal array for favourable flow distribution and minimal pressure drop. In still other embodiments, the modules may be mounted in combination with a single manifold layer. It is noted that the embodiments concern any combination of the above disclosed manifold configurations.

Figure 22:
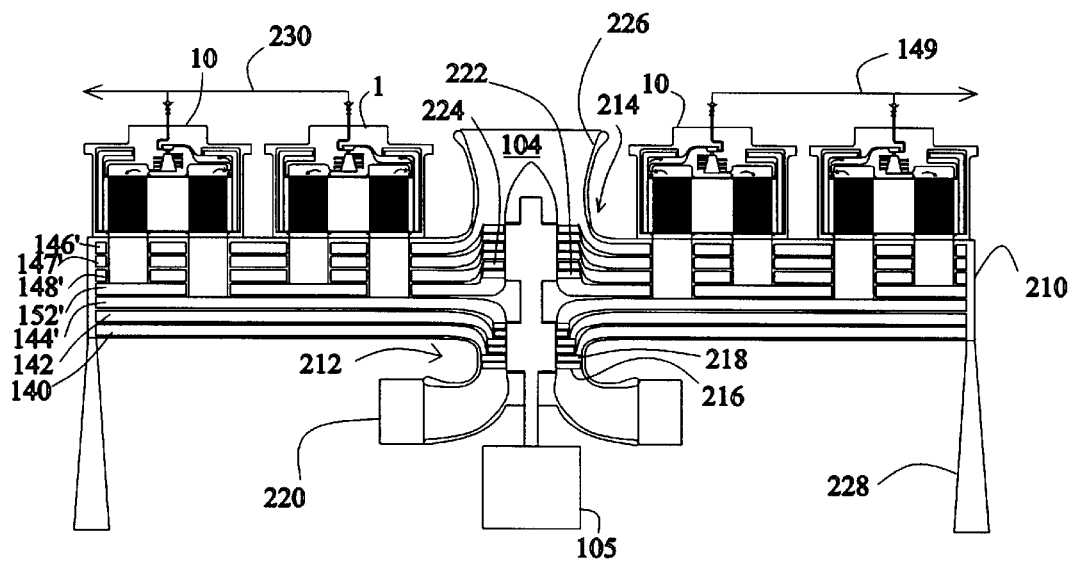
FIG. 22 is a cross sectional view illustrating a multiple module PSA system.
Figure 23:
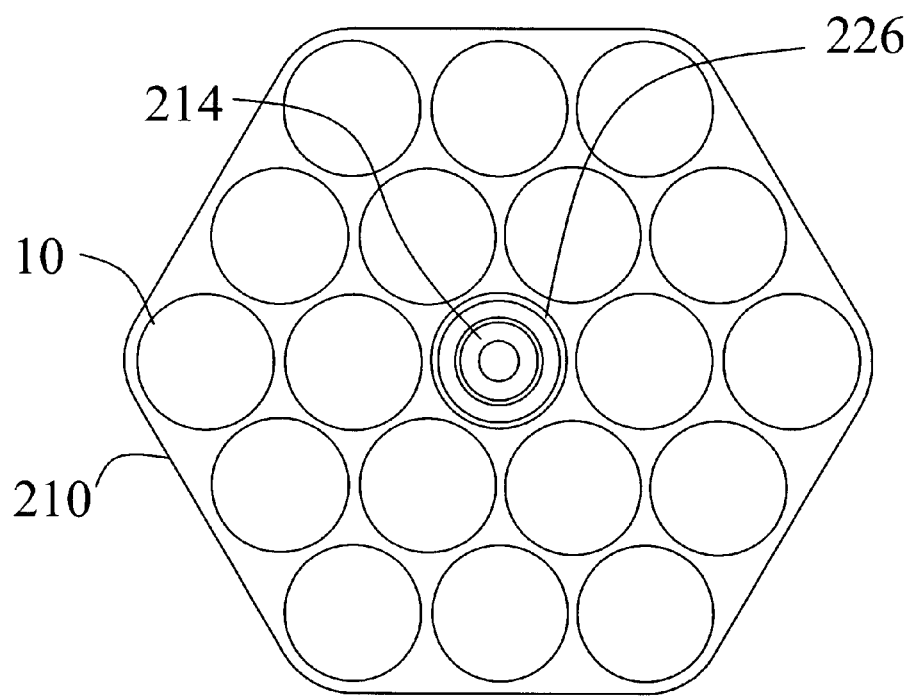
FIG. 23 is a cross sectional view illustrating a multiple module PSA system.

FIG. 22 extends this modularization concept to a large PSA plant with eighteen modules 10 connected in parallel to a common layered manifold 210. In this configuration, the compression machinery is centrally located in the layered manifold 210, while the PSA modules 10 advantageously may be arranged in a hexagonal array as shown in FIG. 23 for favourable flow distribution and minimal pressure drop.

FIG. 22 shows details of particular multistage, axial machine configurations for the compressor 212 and vacuum pump 214. Each compressor stage has rotor blades 216 followed by stator blades 218. Bleed streams are withdrawn between the stages into feed manifolds 140' and 142', while the remaining mass flow is delivered by the final compressor stage to manifold 210. The first stage receives ambient air through an intake filter and silencer 220. It will be noted that the axial compressor stages are highly tapered for reduced sectional flow area toward the high pressure end, taking account of compression as well as mass flow withdrawal from interstage bleeds.

Each vacuum pump stage has rotor blades 222 and stator blades 224. The lowest pressure exhaust stream enters the first stage from manifold 152', while supplementary exhaust streams are injected into the ascending stages from manifolds 148'. In this embodiment, the earliest countercurrent blowdown stream exits manifold 146' at approximately ambient pressure, and is entrained by the vacuum pump discharge in exhaust diffuser 226. As mass flow is being added between stages to offset the effect of compression, the vacuum pump stages may be non-tapered or only slightly tapered.

The layered manifold 210 is supported on pedestals 228 to facilitate access for the compressor. Alternatively, an excavated central well may be provided to accommodate installation of the compressor and its drive. It will be appreciated that this plant configuration readily allows servicing access to the compression machinery and to the PSA modules, which may be removed and exchanged simply by disconnecting and reconnecting the product delivery lines 230.

The layered manifold 210 may be constructed of welded steel plate, or for very large plants preferably from reinforced concrete. Transverse reinforcing struts may be provided to assist the interpenetrating ducts and side walls in supporting compressive stresses due to structural weight and subatmospheric pressures, or tensile stresses due to positive pressures overcoming the structural weight above a given manifold layer. Suitable flange inserts will be needed in a concrete layered manifold to provide adequate static sealing surfaces mating with the modules. With concrete construction for plates 192, the weight of the upper layers will assist in containing elevated working pressures within lower manifold layers. Hence, it is desirable that the lower layers of the manifold be used for higher pressures, and that the upper levels of the manifold be used for lower pressures of the PSA cycle.

While the above examples primarily deal with the relatively low pressure and ambient temperature PSA application of oxygen enrichment over nitrogen-selective adsorbents, it will be evident that the invention, or important aspects thereof, may be applied to the full range of PSA applications in commercial use or under research investigation. In particular, the invention applies to hydrogen purification extending up to high working pressures, and to high temperature applications of PSA including direct coupling of PSA to chemical reaction processes.

III. Detail Portion 76 of Alternative Adsorbent Structures

Figure 27:
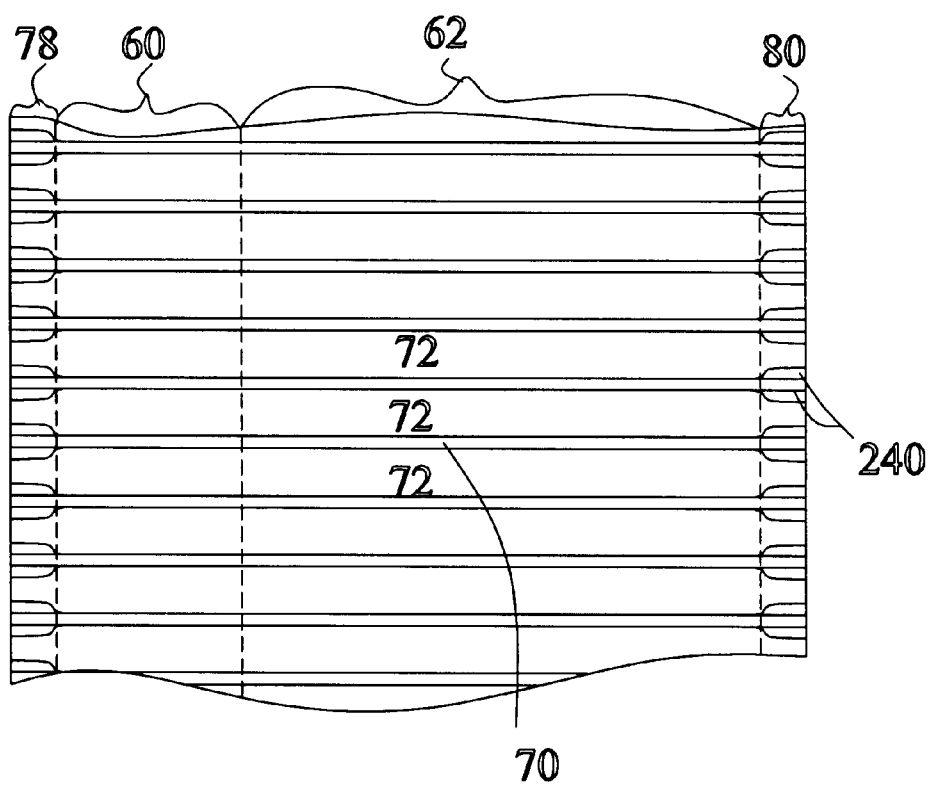
FIG. 27 provides details of an embodiment of an alternative adsorbent laminate structure that can be used in combination with the embodiments of the apparatus and method described herein.

FIGS. 24–30 show section detail 76 of alternative adsorbent laminate structures forming the spiral roll 56 of FIG. 13. FIG. 27 shows parallel spacers 70 on an adsorbent sheet not yet formed into the spiral roll, with fillers 240 of inert material narrowing the flow channels to contracted flow channels 72 in end zones 78 and 80, and ported respectively to the first valve faces 46 and second valve faces 48. The filler material (e.g. ceramic, polymeric materials, metal/alloy material, or combinations thereof) 240 is selected for durability and favourable wear properties. Fillers 240 may be fabricated as part of the spacers 70 (with accurate dimensioned gaps left between the fillers for flow channels 72') before winding the roll. Alternatively, fillers 240 may be cast in place while the roll is being wound or subsequently, using narrow and precisely dimensioned mold cores or fugitive inserts to form the contracted channels 72'.

Figure 24:
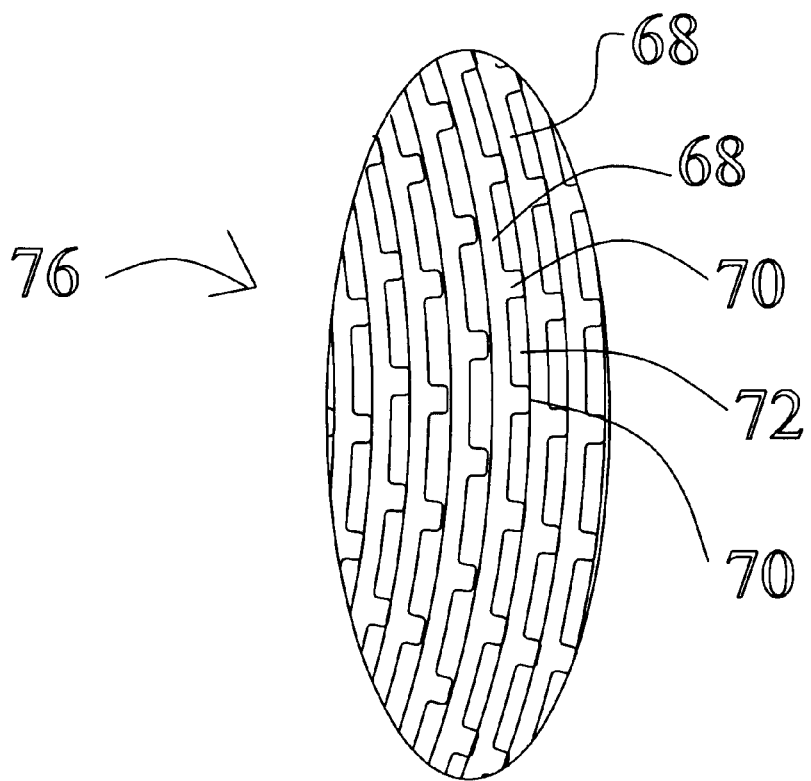
FIG. 24 provides details of an embodiment of an alternative adsorbent laminate structure that can be used in combination with the embodiments of the apparatus and method described herein.
Figure 28:
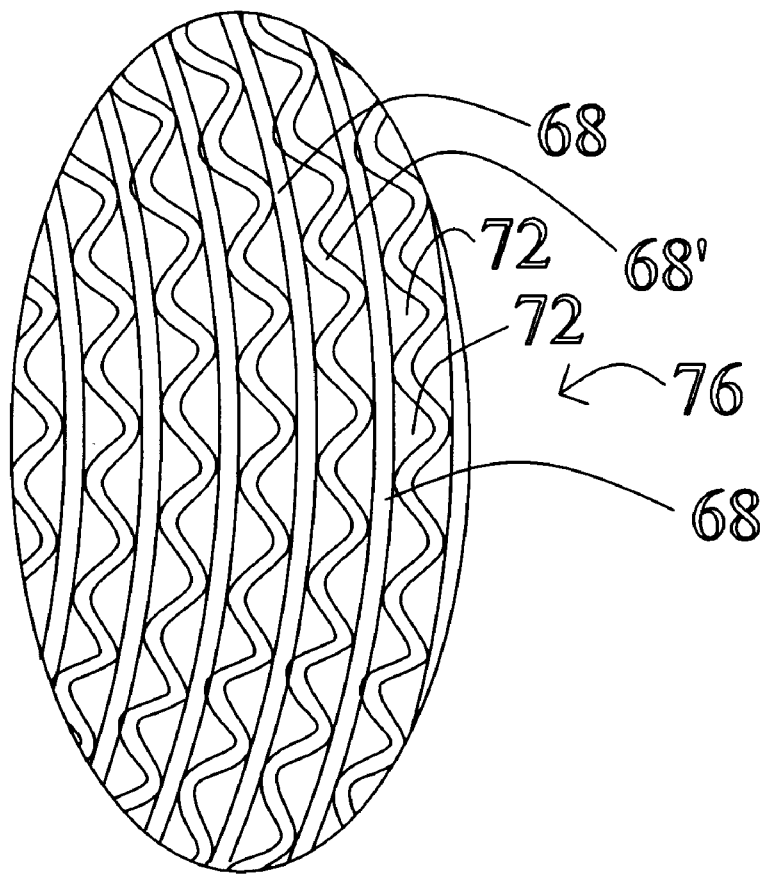
FIG. 28 provides details of an embodiment of an alternative adsorbent laminate structure that can be used in combination with the embodiments of the apparatus and method described herein.

FIG. 24 shows the spacers 70 as ribs formed on the adsorbent sheets and extending across the sheets transverse to the winding direction as shown in FIG. 28. An adsorbent slurry or other bonding sealant may be applied to the crests of spacers 70 during winding, so as to provide transverse sealing between adjacent channels 72.

Figure 25:
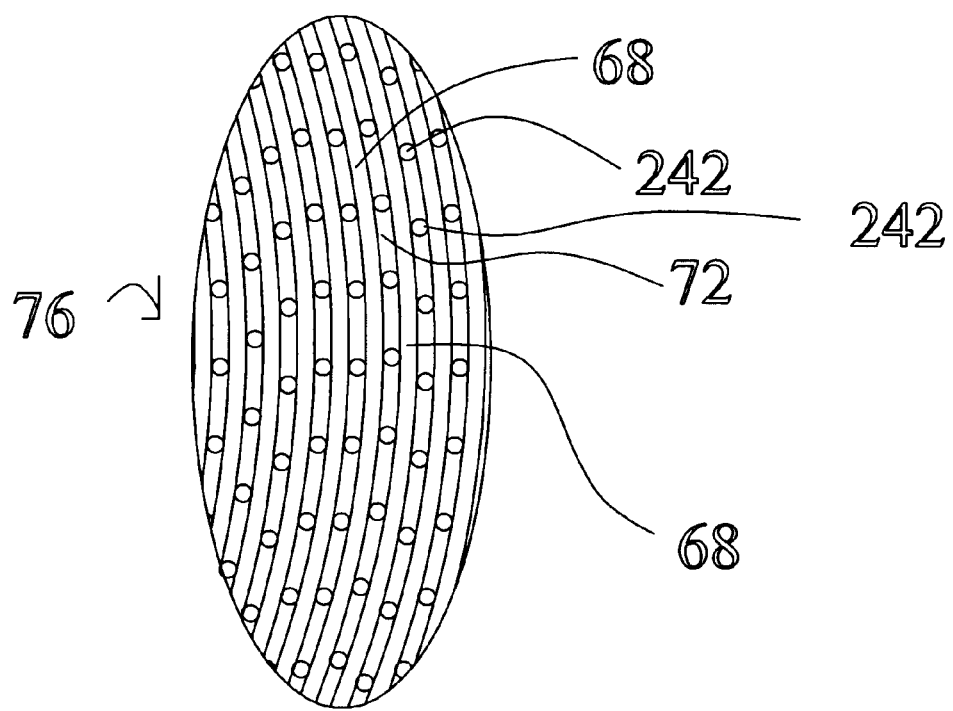
FIG. 25 provides details of an embodiment of an alternative adsorbent laminate structure that can be used in combination with the embodiments of the apparatus and method described herein.
Figure 26:
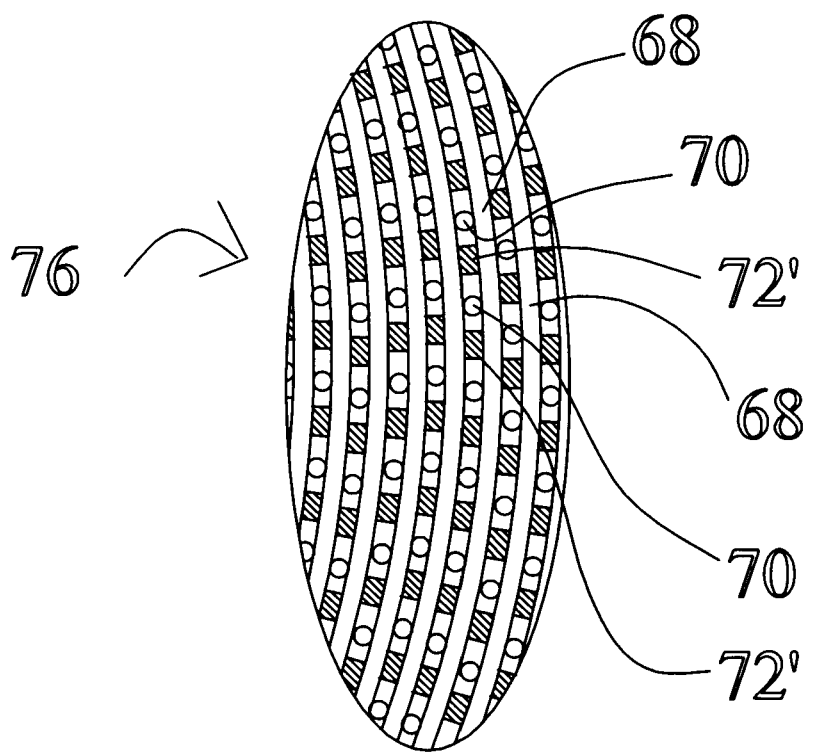
FIG. 26 provides details of an embodiment of an alternative adsorbent laminate structure that can be used in combination with the embodiments of the apparatus and method described herein.
Figure 29:
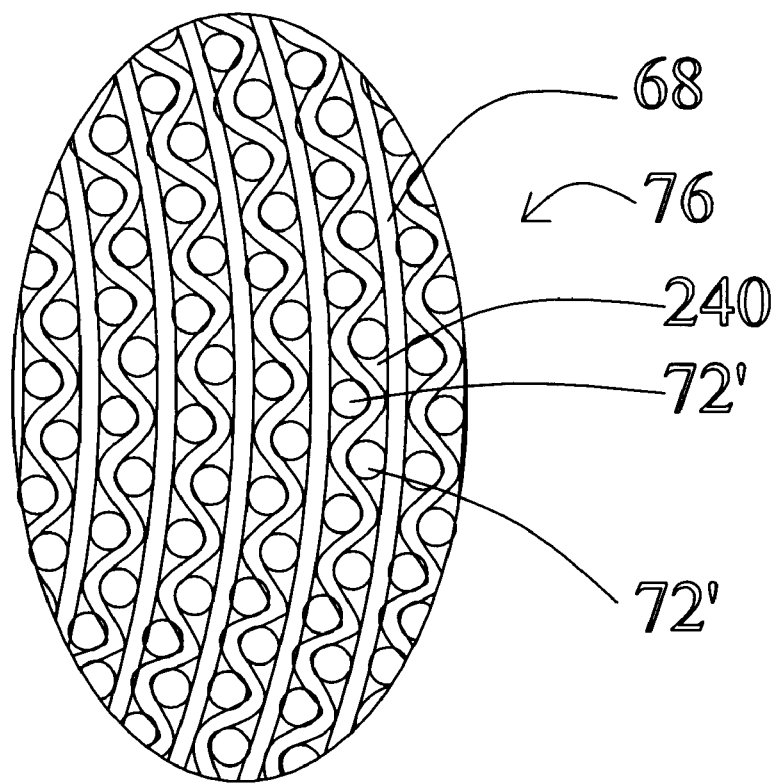
FIG. 29 provides details of an embodiment of an alternative adsorbent laminate structure that can be used in combination with the embodiments of the apparatus and method described herein.

FIG. 25 shows the spacers provided as wires or narrow bars 242 between adjacent layers of the spiral roll. The wires 242 are evenly spaced in the winding direction to define flow channels 72. Wires 242 may be braced with fine cross wires or foils to define a spacer mesh. FIG. 25 is a section across adsorbent zones 60 or 62, while FIG. 29 is a section across end zones 78 or 80. FIG. 29 shows filler 240 defining the contracted flow channels 72 (here filler 240 may be a portion of metal strips bracing wires 242 in the end zones, while such strips may be spirally wound as part of a spacer mesh over the adsorbent sheet being rolled).

FIG. 28 shows a corrugated spiral roll formed by winding flat adsorbent sheets 68 alternatingly with corrugated adsorbent sheets 68'. The flow channels 72 here are sinusoidal in section, which is less desirable owing to stagnant flow in the corner interstices.

Figure 30:
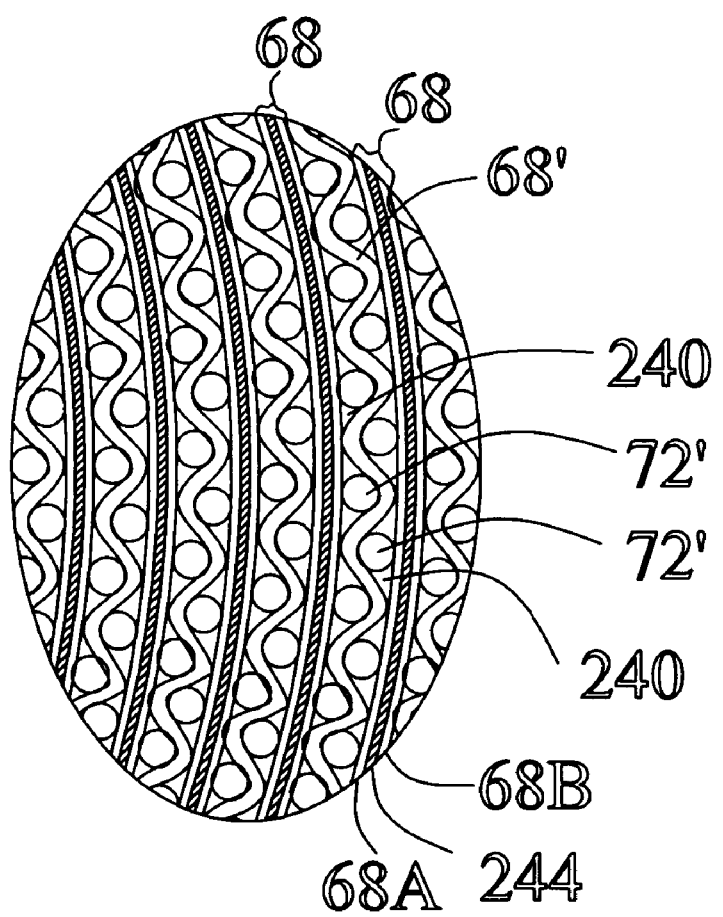
FIG. 30 provides details of an embodiment of an alternative adsorbent laminate structure that can be used in combination with the embodiments of the apparatus and method described herein.

In FIGS. 29 and 30, contracted flow channels 72' are formed by positioning filler 240 within the corrugations, accurate dimensioning of the flow channels 72'being achieved either by mold inserts or by fugitive channel formers, such as polymeric hollow fibber, which can be removed chemically or physically, e.g. by combustion or dissociation, or by phase change to liquid or vapour forms. In adsorbent zones 60 and 62, the filler 240 would be an appropriate porous adsorbent material, while in end zones 78 and 80 the filler preferably may be a durable and dense inert material 210. The end zone filler 240 alternatively may be an adsorbent material, which has been hardened by a rigidizing treatment.

In FIG. 30, an adsorbent sheet 68 has been divided into two adsorbent layers 68A and 68B on opposite sides of a metal foil 244. The metal foil may be any metal suitable to prevent fluid flow through such adsorbent sheets, and which provides desirable thermal properties of enhanced heat capacity and thermal conductivity to the adsorbent laminate. One example of such a metal is aluminium. Alternatively, the metal foil 244 may be a ferritic stainless steel, preferably containing some aluminium which can be oxidized or anodised to form a textured alumina surface for favourable adhesion of zeolite or alumina coatings 68A and 68B.

A steel or stainless steel foil (or directional non-metallic fibre reinforcements) may be used to give desired tensile strength and stiffness to the adsorbent laminate sheets. Because the adsorbent sheets and flow channels are quite thin, angular pressure gradients between angularly separated zones of instantaneously high pressure and low pressure in the adsorbent laminate roll will result in rather small tensile (or compressive) hoop loads on the laminate sheets. Consequently, the adsorbent laminate roll (formed from suitably reinforced adsorbent sheet) can be substantially self-supporting under cyclic pressure variations of the PSA cycle, even when operating at high working pressures in the range of 20 bars or more as frequently required in industrial hydrogen purification.

The spirally wound adsorbent laminate roll may be terminated by winding external multi-layer wraps of steel or stainless steel foil in order to provide uniform tensile preloading, and uniform radial pressure and strains, in the adsorbent laminate. This also ensures tight static sealing of the exterior of the roll against bypass leakage. The product gas at substantially the higher pressure of the PSA cycle can be circulated on the outside of the wrapped spiral roll so that the adsorber housing is subjected to primarily compressive loads. The adsorbent laminate sheet and spacers need to withstand cyclic lateral compression loads in this approach.

Figure 31:
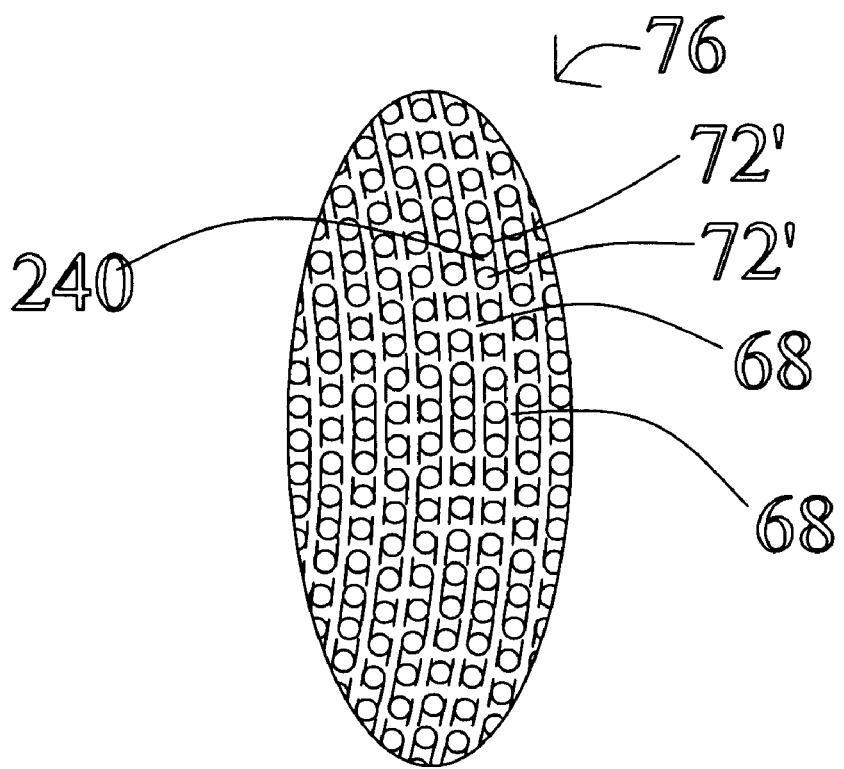
FIG. 31 provides details of an embodiment of an alternative adsorbent laminate structure that can be used in combination with the embodiments of the apparatus and method described herein.

In FIG. 31, narrow and densely packed round flow channels 72' are formed in adsorbent filler 240 between adsorbent sheet layers 68 during the winding operation. The channels 72' are defined by fugitive fibres or hollow fibres to be removed after the adsorbent slurry has hardened. Water first may be removed through fugitive hollow fibres formed from a hydrophilic polymer. The position of the fibres in each spacer layer may be defined by woven cross fibres, which are not shown in FIG. 31.

IV. PSA Cycle

The angular position and angular width of the apertures in FIG. 4, the first function ports in FIG. 5, and the second function ports in FIG. 7 or 8, are selected in order to achieve the correct timing of the PSA cycle steps. For the embodiment of n=3, the cycle is divided into six process steps:

(a) supplying feed gas mixture to the first end of the adsorber element over a feed interval which is substantially ⅓ of the cycle period so as to pressurize the adsorber element to substantially the higher pressure, and then to deliver light product gas from the second end of the adsorber element at substantially the higher pressure less flow frictional pressure drops, (b) withdrawing a first light reflux gas enriched in the less readily adsorbed component from the second end of the adsorber element at about the end of the feed interval, and delivering the first light reflux gas to another adsorber element (whose phase is lagging by 120°), (c) withdrawing a second light reflux gas enriched in the less readily adsorbed component from the second end of the adsorber element to depressurize that adsorber element after the feed interval, and delivering the second light reflux gas to a buffer chamber, (d) withdrawing a third light reflux gas enriched in the less readily adsorbed component from the second end of the adsorber element to further depressurize that adsorber element, and delivering the first light reflux gas to another adsorber element (whose phase is leading by 120°), (e) withdrawing second product gas at an exhaust pressure from the first end of the adsorber element over an exhaust interval which is substantially ⅓ of the cycle period so as to further depressurize that adsorber element to substantially the lower pressure while delivering the second product gas, (f) supplying third light reflux gas from another adsorber element (whose phase is lagging by 120°) to the second end of the adsorber element, so as to purge the adsorber element during the latter part of the exhaust interval, (g) supplying second light reflux gas from the buffer chamber to the second end of the adsorber element, so as to partially repressurize the adsorber element prior to the next feed interval, (h) supplying third light reflux gas from another adsorber element (whose phase is leading by 120°) to the second end of the adsorber element, so as to further repressurize the adsorber element prior to the next feed interval, and (i) cyclically repeating the above steps over successive rotational angles of 360°/m, while feed gas is continuously supplied to substantially one adsorber set at a time, and exhaust gas is continuously removed from substantially one adsorber set at a time.

Figure 3:
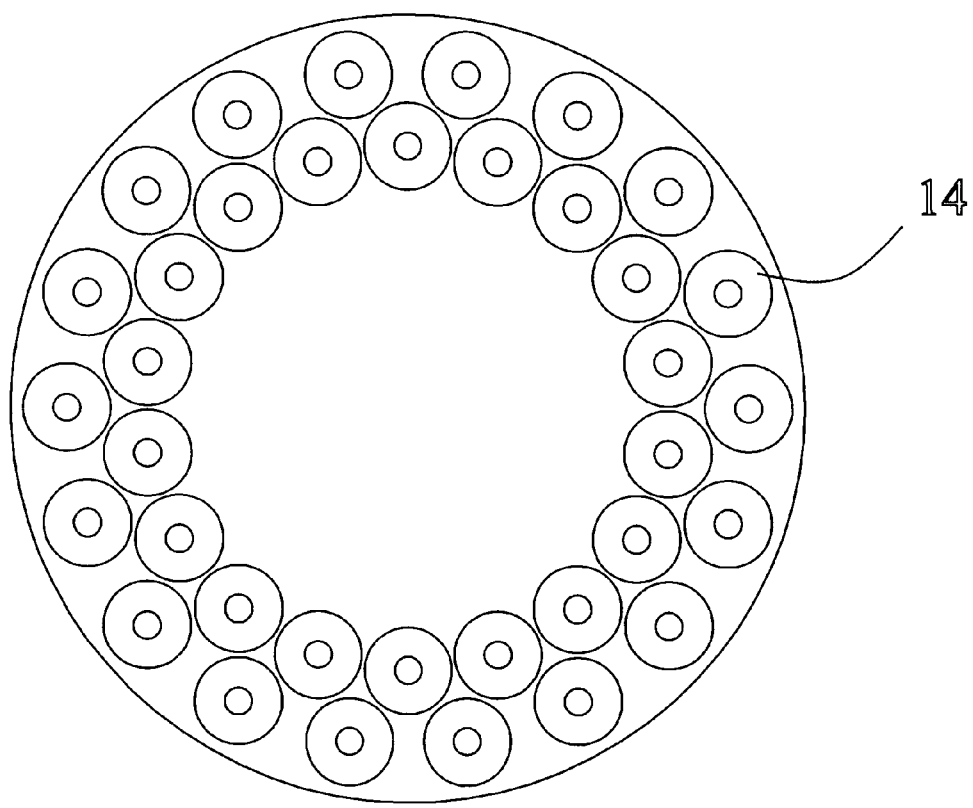
FIG. 3 is a cross sectional view of the apparatus of FIG. 1 taken along line 3—3 for embodiments having n=3 and M=6 for N=18 adsorber elements.

FIGS. 3 and 9–12 apply to an alternative embodiment with n=6, m=6 and N=36. FIGS. 3 and 9 are alternative sections of FIG. 1 showing the 36 adsorbers. FIG. 3 shows two annular rings each of 18 spiral roll adsorbers 14 as shown in FIG. 1. FIG. 9 shows alternative adsorbers 14 formed as stacks of rectangular sheets of reinforced adsorbent material alternating with spacers, and inserted in matching rectangular cavities or slots.

FIG. 10 shows the second apertures 52 of the second rotor plate in the second valve face 48 for 36 adsorbers.

FIG. 11 shows the function ports of the first valve face 46 for the example of n=6 and m=6. In this embodiment, four first functions are provided as a first feed function, a second feed function, a first exhaust function and a second exhaust function. These first functions respectively correspond in FIG. 11 to first feed ports 176, second feed ports 178, first exhaust ports 180 and second exhaust ports 182.

The first feed function is feed pressurization, and at all times one and only one adsorber set is undergoing feed pressurization. Hence, a first feed compressor may provide feed gas to each adsorber set at a fluctuating pressure which is on average less than the higher pressure, and thus may achieve a considerable saving in power consumption. The second feed function is for production, serving at all times in this example one and only one adsorber set. This second feed function may be served by a second feed compressor whose feed pressure is relatively constant and substantially equal to the higher pressure.

The first exhaust function is exhaust depressurization or countercurrent blowdown, and at all times one and only one adsorber set is undergoing this step. For a vacuum PSA cycle, a first vacuum pump as the first exhaust means may withdraw exhaust gas from each adsorber set at a fluctuating pressure which is on average higher than the lower pressure corresponding to maximum vacuum, and thus may achieve a considerable saving in power consumption. The second exhaust function is for exhaust at substantially constant lower pressure with purge, serving at all times in this example one and only one adsorber set. This second exhaust function may be served by a second vacuum pump whose suction pressure is relatively constant at the lower pressure.

For a positive pressure PSA cycle whose lower pressure is substantially atmospheric pressure, a throttling orifice function may be provided in or with the first exhaust ports to achieve the pressure letdown of each adsorber set during countercurrent blowdown without excessive flow disturbances. Alternatively, an expander may be provided as the first exhaust means to recover energy from countercurrent blowdown. This expander will be operating under varying inlet pressure following the adsorber set depressurization in each first exhaust step of a time interval in this example of one sixth of the cycle period.

If the cycle period is one second, the adsorber rotor will rotate at 10 RPM for m=6. For n=6, each first or second feed step and each first or second exhaust step will have a duration of ⅙ second. The cyclic pressure transients of the first feed function and the first exhaust function may be accepted by positive displacement compression machinery of relatively high operating speed, for example twin screw machines. Alternatively, low speed reciprocating or rotary compression (or expansion) machinery may be used for any of the feed functions of feed or exhaust, so that each compression (or expansion) stroke corresponds to a single first function step and is synchronized to the beginning and end of that step. Again, for the cycle period of 1 second the reciprocating speed (with two opposed compression chambers delivering alternating first function steps) would be 180 RPM.

FIG. 30 is the section of FIG. 1 indicated by lines 8—8 for n=6 and m=6. This arrangement is identical to that of FIG. 6, except that the buffer chambers 110 have been deleted since the second reflux gas is now conveyed from adsorber elements 56 communicating with ports 92 and 104 by direct equalization.

For the process with n=6, the steps in the above example are characterized as:

(a) supplying feed gas mixture to the first end of the adsorber element over a feed pressurization interval which is about ⅙ of the cycle period so as to pressurize the adsorber element to substantially the higher pressure, and then to deliver light product gas from the second end of the adsorber element at substantially the higher pressure less flow frictional pressure drops, (b) further supplying feed gas mixture to the first end of the adsorber element over a production interval which is about ⅙ of the cycle period to deliver light product gas from the second end of the adsorber element at substantially the higher pressure less flow frictional pressure drops, (c) withdrawing a first light reflux gas enriched in the less readily adsorbed component from the second end of the adsorber element at about the end of the production interval, and delivering the first light reflux gas to another adsorber element (whose phase is lagging by 120°), (d) withdrawing a second light reflux gas enriched in the less readily adsorbed component from the second end of the adsorber element to depressurize that adsorber element after the feed interval, and delivering the second light reflux gas to another adsorber element in 180° opposed phase, (e) withdrawing a third light reflux gas enriched in the less readily adsorbed component from the second end of the adsorber element to further depressurize that adsorber element, and delivering the first light reflux gas to another adsorber element (whose phase is leading by 120°), (f) withdrawing second product gas from the first end of the adsorber element over a first exhaust interval which is about ⅙ of the cycle period so as to further depressurize that adsorber element to substantially the lower pressure while delivering the second product gas, (g) further withdrawing second product gas from the first end of the adsorber element over a second exhaust interval which is about ⅙ of the cycle period at substantially the lower pressure while delivering the second product gas, (h) supplying third light reflux gas from another adsorber element (whose phase is lagging by 120°) to the second end of the adsorber element, so as to purge the adsorber element during the second exhaust interval, (i) supplying second light reflux gas from another adsorber element in 180° opposed phase, so as to partially repressurize the adsorber element, (j) supplying third light reflux gas from another adsorber element (whose phase is leading by 120°) to the second end of the adsorber element, so as to further repressurize the adsorber element prior to the next feed interval, and (k) cyclically repeating the above steps over successive rotational angles of 360°/m.

IV. Radial Flow Embodiments, FIGS. 33–36

Figure 33:
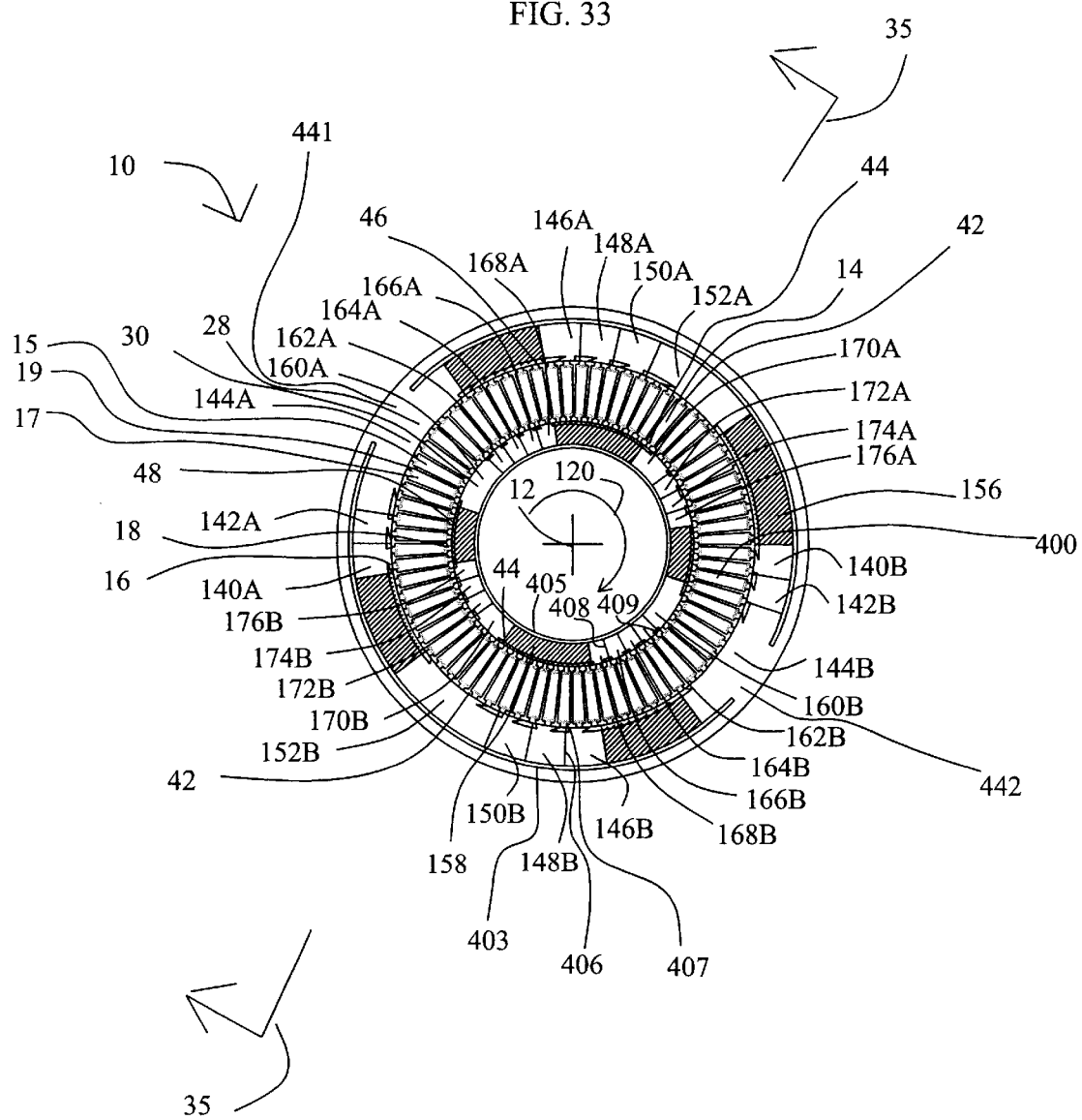
FIG. 33 is a top, cross-sectional view of a radial flow module with two cycles per revolution.

In general, disclosed embodiments of the apparatus may be configured for flow through the adsorber elements in the axial, radial or obliquely conical directions relative to the rotor axis. A radial flow rotary module 10 according to the invention is shown in FIGS. 33 and 36. FIG. 33 shows a top, cross-sectional view of a radial flow module with two cycles per revolution so that M=2. FIG. 36 shows a cross sectional schematic view of module 10 with a cross sectional reference to FIG. 34.

Figure 35:
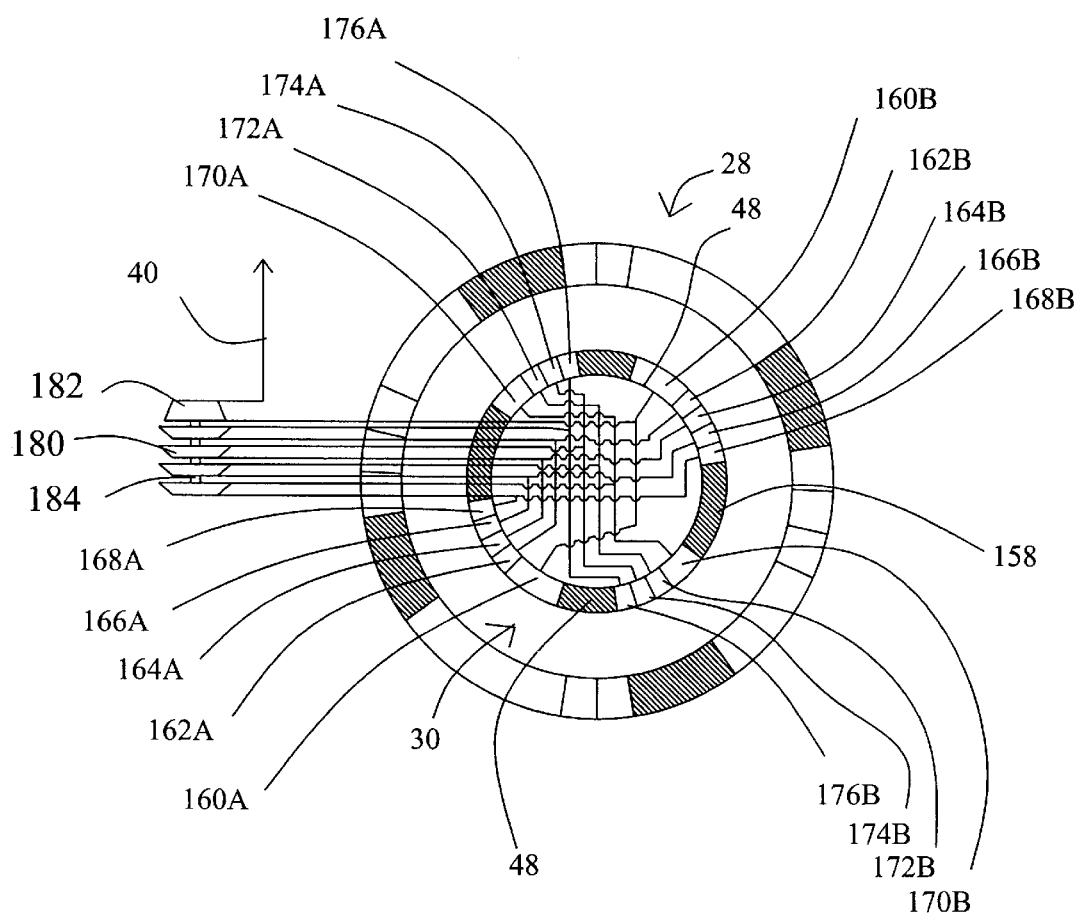
FIG. 35 is a top view of the product end of the module illustrated in FIG. 33.

Module 10 includes a rotor 400 revolving about axis 12 in the direction shown by arrow 120 within stator 30. FIG. 35 is an axial section of the module 10, defined by arrows 35—35 in FIG. 33, with module 10 installed in part of a layered manifold assembly 190, which may include other similar modules. FIG. 33 is a cross-section of the module 10, defined by arrows 33—33 in FIG. 36.

Figure 32:
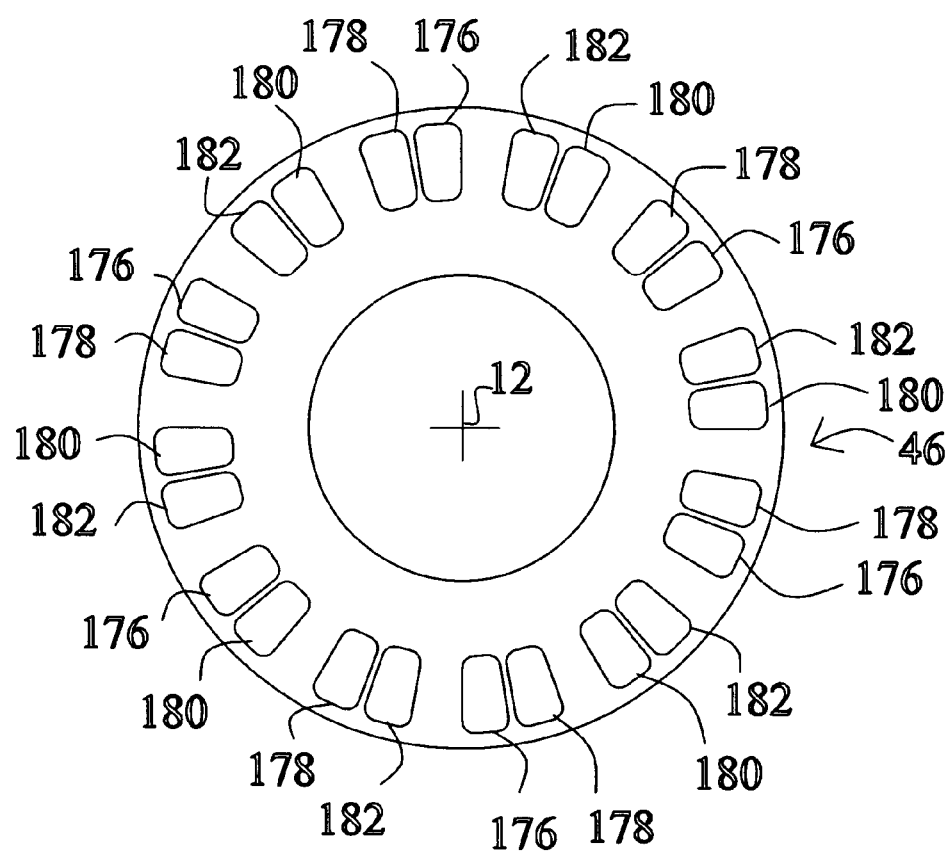
FIG. 32 is a cross sectional view of the apparatus of FIG. 1 with n=6 and M=6 for N=36 adsorber elements.

As shown in FIG. 32, the rotor 400 is annular, having an outer cylindrical wall 16 concentric with axis 12. Outer cylindrical wall 16 has an external surface which defines first valve surface 46. Inner cylindrical wall 18 has an internal surface which defines second valve surface 48. The rotor 400 has (in the plane of the section defined by arrows 32—32 in FIG. 36) a total of "N" radial flow adsorber elements 14. An adjacent pair of adsorber elements 14A and 14B are separated by partition 19, which is structurally and sealingly joined to outer wall 16 and inner wall 18. Adjacent adsorber elements 14A and 14B are angularly spaced relative to axis 12 by an angle of [360°/N].

Adsorber element 14 has a first end 42 and a second end 44. The adsorber preferably may be provided as an adsorbent laminate pack, with flow channels 72 between the sheets of the laminate pack providing a flow path between the first and second ends 42, 44 of the adsorber 14. The first and second ends 42, 44 of the adsorbers 14 communicate respectively to the first and second valve surfaces 46, 48 by apertures at the first and second ends respectively through outer wall 16 and inner wall 18.

As shown in FIGS. 32 and 35, module 10 includes a stator assembly 401. Assembly 401 includes an outer cylindrical shell 403 enclosing the first valve function compartments of first valve stator 28 outside the annular rotor 400, and an inner cylindrical shell 405 supporting the second valve function compartments of second valve stator 30 inside the annular rotor 400. Outer shell 403 carries partitions 406 between adjacent function compartments and supporting axially extending valve seal elements 407 sealingly engaged with first valve surface 46, while inner shell 405 carries partitions 408 supporting axially extending valve seal elements 409 sealingly engaged with second valve surface 48. The azimuthal sealing width of the strip seals is greater than the azimuthal widths of the apertures through the outer and inner walls 16, 18 at the first and second ends 42, 44 of each adsorber 14 in the first and second valve surfaces 46, 48.

The stator assembly 401 also includes a top plate 411 and a bottom plate 413, each connecting outer shell 403 and inner shell 405 so as to enclose rotor 400. Rotor 400 is supported by upper bearing 405 in top plate 411, and lower bearing 417 in bottom plate 413. A rotor drive (not shown) is provided in stator assembly 401 to rotate rotor 400 at a desired rotational frequency. The rotor drive means may be an appropriate form of rim drive for rotor 400.

The stator assembly 401 further includes sealing flanges 421 with static seals (e.g. O-rings) 422 to engage sealing collars 423 in each manifold separator plate 192, and a top flange 425 to locate the module 10 within the layered manifold structure for proper engagement of the seals. Radial flow module 10 is installed as a plug penetrating the layered manifold structure. For very large capacity PSA plants, any desired number of such modules 10 may be installed in a layered manifold assembly similar to that depicted in FIGS. 22 and 23.

Figure 34:
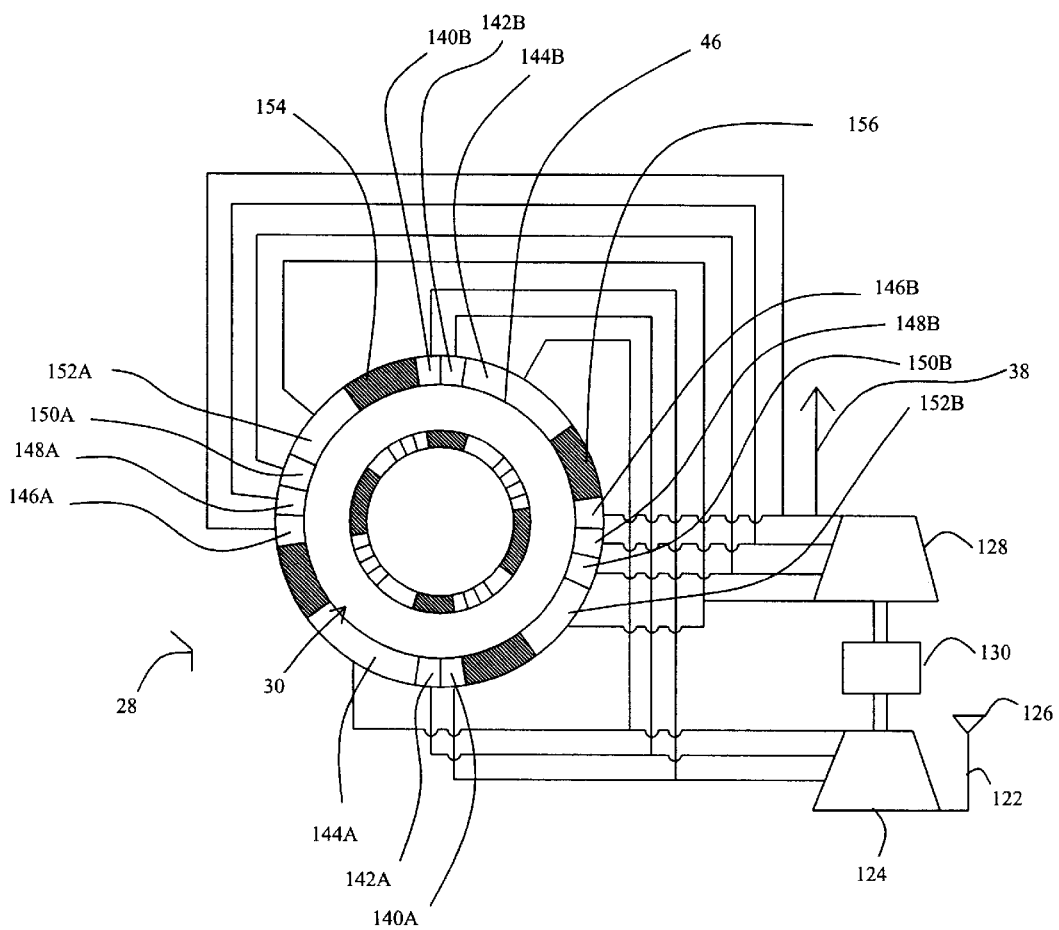
FIG. 34 is a top view of the feed end of the module illustrated in FIG. 33.

FIGS. 34 and 35 respectively show the labelling and manifolded interconnection of the first functional compartments in the first valve stator 28 and in the second valve stator 30. A set of first compartments in the outer shell 403 each open in an angular sector to the first valve surface 46, and each provide fluid communication between its angular sector of the first valve surface 46 and a manifold external to the module 10. The angular sectors of the compartments are much wider than the angular separation of the adsorber elements 14. The first compartments are separated on the first sealing surface 46 by the valve seal elements. Proceeding clockwise in FIG. 33, in the direction of rotor rotation, the first compartments are provided with the same functions and the same reference numerals as used in FIGS. 17 and 18 with reference numeral subscripts A and B reflecting the present example of M=2.

FIG. 34 shows a plan view of the feed end of the module. FIG. 34 shows the first stator valve face 46 of the first stator 28 in the first valve face 46, in the plane defined by arrows 10—10, and for the example of a vacuum PSA system for separating oxygen from air. Fluid connections are shown to a feed compressor 124 inducting feed air from inlet filter 126, and to a vacuum pump exhauster 128 delivering nitrogen-enriched second product to a second product delivery conduit 38. Compressor 124 and exhauster 128 are shown coupled to a drive motor 130.

Arrow 120 indicates the direction of rotation by the adsorber rotor. In the annular valve face between circumferential seals 134 and 136, the open area of first stator valve face 46 ported to the feed and exhaust compartments is indicated by clear angular segments 140–152 corresponding to the first functional ports communicating directly to functional compartments identified by the same reference numerals 140–152. The substantially closed area of valve face 46 between functional compartments is indicated by hatched sectors 154 and 156 which are slippers with ideally zero clearance, or in actual practice a narrow clearance to reduce friction and wear without excessive leakage. Gradual opening is provided by a tapering clearance channel between each valve seal element and the sealing face, so as to achieve gentle pressure equalization of an adsorber being opened to a new compartment. Much wider closed sectors are provided to substantially close flow to or from one end of the adsorbers when pressurization or blowdown is being performed from the other end.

With reference to FIGS. 33 and 36, it will be noted that penetrations 441 and 442 are provided in outer stator shell 403 so as to provide direct fluid communication from feed manifold 144' to corresponding function compartments 144A and 144B. Other penetrations are similarly provided in outer shell 403 so as to provide direct fluid communication from each manifold layer (of a pressurization or exhaust function) to the corresponding first valve function compartments for that pressurization or exhaust function.

The feed compressor provides feed air to feed pressurization compartments 140A and 140B, and to 142A and 142B, and to feed production compartments 144A and 144B. Compartments 140 and 142 have successively increasing working pressures, while compartment 144 is at the higher working pressure of the PSA cycle. Compressor 124 may thus be a multistage or split stream compressor system delivering the appropriate volume of feed flow to each compartment so as to achieve the pressurization of adsorbers through the intermediate pressure levels of compartments 140 and 142, and then the final pressurization and production through compartment 144. A split stream compressor system may be provided in series as a multistage compressor with interstage delivery ports; or as a plurality of compressors or compression cylinders in parallel, each delivering feed air to the working pressure of a compartment 140 to 144. Alternatively, compressor 124 may deliver all the feed air to the higher pressure, with throttling of some of that air to supply feed pressurization compartments 140 and 142 at their respective intermediate pressures.

Similarly, vacuum pump 128 exhausts nitrogen-enriched heavy product gas from exhaust compartments 152A and 152B at the lower pressure of the cycle and from countercurrent blowdown compartments 150A and 150B, and 148A and 148B at the successively increasing working pressures of those compartments. The early countercurrent blowdown stream from compartments 146A and 146B may be released at ambient pressure directly to heavy product delivery conduit 129. Similarly to compressor 124, vacuum pump 128 may be provided as a multistage or split stream machine, with stages in series or in parallel to accept each flow at the appropriate intermediate pressure ascending from the lower pressure.

FIG. 35 shows the second stator valve face 48. Open ports of the valve face 48 are second valve function ports communicating directly to a light product delivery compartment 160; a number of light reflux exit compartments 162A and 162B, 164A and 164B, 166A and 166B, and 168A and 168B; and the same number of light reflux return compartments 170A and 170B, 172A and 172B, 174A and 174B, and 176A and 176B within the second stator. Each pair of light reflux exit and return compartments provides a stage of light reflux pressure letdown, respectively for the PSA process functions of supply to backfill, full or partial pressure equalization, and cocurrent blowdown to purge.

Illustrating the option of light reflux pressure letdown with energy recovery, a split stream light reflux expander 180 is provided to provide pressure let-down of four light reflux stages with energy recovery. The light reflux expander serves as pressure let-down means for each of four light reflux stages, each stage having a light reflux conduit respectively between a pair of light reflux exit and return ports as illustrated.

Product oxygen from light product functional compartments 160A and 160B is delivered to product booster compressor 182 or else directly to product delivery conduit 40.

It will be appreciated by those skilled in the art that numerous variations of the PSA cycle may be applied for a wide range of "n" and "M" within the scope of the present invention, and with the benefits provided by this invention. For example, described embodiments are disclosed with reference to particular features. It should be appreciated that the scope of the present invention should not be limited to these described features, but rather should be determined with reference to the following claims.

We claim:
1. A rotary adsorption apparatus, including a module comprising:
   a stator defining plural fluid inlet, exhaust and delivery ports;
   a plurality of adsorber elements arranged in at least one adsorber set operably coupled to a rotor, the rotor being capable of rotation relative to the stator for rotating the adsorber elements adjacent the inlet ports;
   a first manifold for receiving a feed fluid and being intermittently fluidly coupled through the fluid inlet ports to first ends of the adsorber elements in the at least one adsorber set; and
   a second manifold positioned adjacent the first manifold and intermittently fluidly coupled to first ends of the absorber elements in the at least one adsorber set for receiving an exhaust fluid from the first ends of the adsorber elements through plural exhaust ports defined by the stator and through a fluid conduit penetrating through the first manifold.

2. The rotary adsorption apparatus according to claim 1, wherein the at least one adsorber set comprises first and second adsorber sets, the first and second adsorber sets sequentially receiving feed fluid from the first manifold.

3. The rotary adsorption apparatus according to claim 1 comprising from 2 to about 20 adsorber sets.

4. The rotary adsorption apparatus according to claim 1 wherein the at least one adsorber set comprises 6 adsorber elements.

5. The rotary adsorption apparatus according to claim 1 with the module having three adsorber sets.

6. The rotary adsorption apparatus according to claim 1 with the module having six adsorber sets.

7. The rotary adsorption apparatus according to claim 1 where the feed fluid is air, the adsorber elements include a nitrogen selective zeolite and the exhaust fluid is nitrogen.

8. The rotary adsorption apparatus according to claim 1 where the adsorber elements in the module are annularly arranged about an axis of rotation.

9. The rotary adsorption apparatus according to claim 8 wherein there are M adsorber sets each set having n adsorbers at an angular spacing of 360/M.

10. The rotary adsorption apparatus according to claim 1 wherein the module is a rotary adsorber module.

11. The rotary adsorption apparatus according to claim 1 where the first and second manifolds are annular.

12. The rotary adsorption apparatus according to claim 1 with the module comprising at least one manifold in addition to the first and second manifolds.

13. The rotary adsorption apparatus according to claim 12 where the manifolds are annular and are arranged coaxially one above the other.

14. The rotary adsorption apparatus according to claim 11 wherein the stator includes first and second valve surfaces, and the fluid delivery ports are circumferentially spaced about an axis and over a majority of planar surfaces.

15. The rotary adsorption apparatus according to claim 14 where the fluid inlet ports are spaced over 360 degrees of the stator.

16. The rotary adsorption apparatus according to claim 14 wherein there are c fluid delivery ports at an angular spacing of 360/c.

17. The rotary adsorption apparatus according to claim 1 wherein the stator includes first and second valve surfaces, and the fluid exhaust ports are circumferentially spaced about an axis and over a majority of planar surfaces.

18. The rotary adsorption apparatus according to claim 17 where the stator includes first and second planar valve surfaces and fluid flow through the apparatus is axial and normal to the first and second planar valve surfaces.

19. The rotary adsorption apparatus according to claim 17 where the stator includes first and second cylindrical valve surfaces, fluid flow through the apparatus is radial and the first and second valve faces are concentric to the fluid flow.

20. The rotary adsorption apparatus according to claim 1 wherein the first manifold is connected to a compressor.

21. The rotary adsorption apparatus according to claim 1 wherein the second manifold is connected to fluid exhaust means.

22. The rotary adsorption apparatus according to claim 1 wherein the first manifold is connected to a compressor and the second manifold is connected to fluid exhaust means, and wherein the fluid delivery means and the fluid exhaust means are operably coupled to a motor.

23. The rotary adsorption apparatus according to claim 1 where the fluid ports are tapered.

24. The rotary adsorption apparatus of claim 1 comprising a rotary pressure swing adsorption apparatus.

25. A rotary adsorption apparatus, comprising at least one module which includes:
    a plurality of adsorber elements arranged in at least one adsorber set;
    a first stator defining plural fluid inlet ports;
    a first manifold for receiving a feed fluid and being intermittently fluidly coupled through the fluid inlet ports to first ends of the adsorber elements in the at least one adsorber set;
    a second stator comprising pressure swing absorption cycle sectors, each sector being defined by a light product delivery port, light reflux withdrawal ports, and light reflux return ports; and
    a second manifold intermittently fluidly coupled to first ends of the absorber elements in the at least one adsorber set for receiving an exhaust fluid from the first end of the adsorber elements.

26. The rotary adsorption apparatus according to claim 25 where the first and second manifolds are interpenetrating, layered manifolds.

27. The rotary adsorption apparatus according to claim 25 where the manifolds are substantially planar layered manifolds.

28. The rotary adsorption apparatus according to claim 27 where the manifolds are interpenetrating.

29. The rotary adsorption apparatus according to claim 25 where the manifolds are nested, concentric manifolds positioned about a radial flow module.

30. The rotary adsorption apparatus according to claim 29 where the manifolds are interpenetrating.

31. The rotary adsorption apparatus according to claim 26 where the second manifold receives air through a fluid conduit penetrating through the first manifold.

32. The rotary adsorption apparatus according to claim 25 further including seals in the valve faces positioned effectively to minimize fluid leaks.

33. The rotary adsorption apparatus according to claim 25 wherein ends of the adsorber elements are in direct, fluidly sealing contact with the stators.

34. The rotary adsorption apparatus according to claim 25 including a seal located adjacent one of the stators and first ends of the adsorber elements and positioned effectively to reduce fluid leaks, and second ends of the adsorber elements are in direct, fluidly sealing contact with the other of the stators.

35. The rotary adsorption apparatus according to claim 25 where ends of the adsorber elements are positioned within from about 10 microns to about 50 microns of stator valve faces.

36. The rotary adsorption apparatus according to claim 25 where ends of the adsorber elements are positioned within from about 0 microns to about 10 microns of stator valve faces.

37. The rotary adsorption apparatus according to claim 25 where the adsorber elements include first and second ends, spacers to define flow channels between the first and second ends, and at least one of the adsorber elements includes a filler material in a portion of the flow channel adjacent at least one of the first and second ends.

38. The rotary adsorption apparatus according to claim 36 where plural adsorber elements include filler material adjacent at least one of the first and second ends.

39. The rotary adsorption apparatus according to claim 36 where the adsorber elements include filler material adjacent both the first and second ends.

40. The rotary adsorption apparatus according to claim 36 where the filler material is selected from the group consisting of ceramics, metals, plastics, and combinations thereof.

41. The rotary adsorption apparatus according to claim 25 where there are three adsorber elements in each sector, with each adsorber element belonging to a different adsorber set.

42. The rotary adsorption apparatus according to claim 40 wherein light reflux withdrawal ports are intermittently fluidly coupled to angularly lagging fluid return ports.

43. The rotary adsorption apparatus according to claim 25 wherein the fluid ports are arranged such that second ends of the adsorber elements are intermittently sequentially fluidly coupled to the first light product delivery port, the light reflux withdrawal ports, and the light reflux return ports.

44. The rotary adsorption apparatus according to claim 25 wherein each sector comprises a light product delivery port, a first light reflux withdrawal port, a second light reflux withdrawal port, a third light reflux withdrawal port, a third light reflux return port, a second light reflux return port, and a first light reflux return port.

45. The rotary adsorption apparatus according to claim 43 further comprising a plurality of fluid conduits sealingly coupled to the first light reflux withdrawal port, the second light reflux withdrawal port, the third light reflux withdrawal port, the third light reflux return port, the second light reflux return port, and the first light reflux return port.

46. The rotary adsorption apparatus according to claim 44 wherein the first light reflux withdrawal port is fluidly coupled to the first light reflux return port, the second light reflux withdrawal port is fluidly coupled to a buffer chamber, the buffer chamber subsequently being fluidly coupled to the second light return port, and the third light reflux withdrawal port is fluidly coupled to the third light reflux return port.

47. The rotary adsorption apparatus according to claim 25 wherein the fluid ports are arranged such that the second ends of the at least one adsorber set are sequentially fluidly coupled to the first product delivery port, the first light reflux withdrawal port, the second light reflux withdrawal port, the third light reflux withdrawal port, the third light reflux return port, the second light reflux return port, and the first light reflux return port.

48. The rotary absorption apparatus of claim 25 comprising a rotary pressure swing adsorption apparatus.

49. A rotary adsorption device, comprising:
    a stator defining plural fluid ports;
    a plurality of adsorber elements having first and second ends, the adsorber elements being operably coupled to a rotor capable of rotation relative to the stator for rotating ends of the adsorber elements adjacent the fluid ports, at least a portion of the adsorber elements having reinforcing material adjacent the first end, the second end or both, and further with such elements directly fluidly coupling to the fluid ports;

a first annular manifold for receiving a feed fluid and being intermittently fluidly coupled through the fluid ports to first ends of the adsorber elements; and a second annular manifold intermittently fluidly coupled to first ends of the absorber elements for receiving an exhaust fluid from the first end of the adsorber elements through plural exhaust ports defined by the stator and through a fluid conduit penetrating through the first manifold.

50. The rotary adsorption device of claim 49 comprising a rotary pressure swing adsorption device.

51. A rotary adsorption device for performing plural pressure swing adsorption cycles per revolution, including a module comprising:

a first stator having a first valve face and defining plural function ports;

a second stator having a first valve face and defining plural function ports;

plural adsorber elements positioned between the first stator and the second stator, the adsorber elements rotated by a rotor relative to the first and second stators;

a first manifold for delivering a feed fluid to first ends of the adsorber elements through the function ports defined by the first stator, the feed fluid undergoing pressure swing adsorption in the adsorber elements whereby a portion of a light fluid exiting a second end of a first adsorber element in a first adsorber set is delivered through a product port, a second portion of a light fluid is delivered as a first light reflux portion through a first light reflux port fluidly coupled to a first adsorber element in a third adsorber set lagging the first adsorber set, a third portion of a light fluid is delivered as a second light reflux portion to a buffer chamber, a fourth portion of a light fluid is withdrawn as a third light reflux portion through a third light reflux port fluidly coupled to a first adsorber element in a leading second adsorber set; and whereby a portion of a light fluid delivered by a last adsorber element in a third adsorber set is delivered through a third light reflux port to a second end of the first adsorber element in the first adsorber set, a portion of a light fluid delivered by the last adsorber element of a third adsorber set is delivered from a buffer through a second light reflux port to a second end of the first adsorber element in the first adsorber set, and a portion of a fluid delivered by a last adsorber element in a second adsorber set delivers a first light reflux portion through a first light reflux return port to a second end of the first adsorber element in the first subset.

52. The rotary adsorption device according to claim 51 wherein the adsorber elements comprise a spirally wound adsorbent sheet.

53. The rotary adsorption device according to claim 52 further comprising radially extending spacers disposed between the spirally wound adsorbent sheet to define flow channels.

54. The rotary adsorption device according to claim 51 wherein the adsorber elements comprise a first end and a second end, and the first and second ends are reinforced.

55. The rotary adsorption device according to claim 54 wherein the adsorber element comprises at least first and second zones disposed between the first and second reinforced ends wherein the first zone includes a desiccant and the second zone includes a zeolite.

56. The rotary adsorption device according to claim 51 comprising a plurality of annular layered, interpenetrating manifolds.

57. The rotary adsorption device of claim 51 comprising a rotary pressure swing adsorption device.

* * * * *